US012756663B2

(12) United States Patent
Merchant et al.

(10) Patent No.: US 12,756,663 B2
(45) Date of Patent: *Oct. 6, 2026

(54) IP-BASED FORWARDING OF BRIDGED AND ROUTED IP PACKETS AND UNICAST ARP

(71) Applicant: Cisco Technology, Inc., San Jose, CA (US)

(72) Inventors: Sameer Merchant, Sunnyvale, CA (US); Thomas James Edsall, Los Gatos, CA (US); Navindra Yadav, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/986,237

(22) Filed: Dec. 18, 2024

(65) Prior Publication Data

US 2025/0119381 A1 Apr. 10, 2025

Related U.S. Application Data

(63) Continuation of application No. 17/187,332, filed on Feb. 26, 2021, now Pat. No. 12,244,496, which is a (Continued)

(51) Int. Cl.

| | |
|---|---|
| ***G06F 15/173*** | (2006.01) |
| ***H04L 45/74*** | (2022.01) |
| ***H04L 61/103*** | (2022.01) |

(52) U.S. Cl.
CPC ............ *H04L 45/74* (2013.01); *H04L 61/103* (2013.01)

(58) Field of Classification Search
CPC .............................. H04L 45/74; H04L 61/103
(Continued)

(56) References Cited

U.S. PATENT DOCUMENTS

| | | | |
|---|---|---|---|
| 4,298,770 | A | 11/1981 | Nishihara et al. |
| 4,636,919 | A | 1/1987 | Itakura et al. |
| 4,700,016 | A | 10/1987 | Hitchcock et al. |
| 5,115,431 | A | 5/1992 | Williams et al. |
| 5,859,835 | A | 1/1999 | Varma et al. |
| 5,926,458 | A | 7/1999 | Yin |

(Continued)

FOREIGN PATENT DOCUMENTS

| | | | |
|---|---|---|---|
| CN | 102726021 | A | 10/2012 |
| CN | 103155500 | A | 6/2013 |
| EP | 0465201 | B1 | 10/1996 |
| WO | 2014071996 | A1 | 5/2014 |

OTHER PUBLICATIONS

Anonymous, "Subset—Wikipedia, The Free Encyclopedia," Dec. 25, 2014, 3 pages, XP055161881, [Retrieved from Jan. 14, 2015], Retrieved from URL: http://en.wikipedia.org/wiki/Subset.

(Continued)

*Primary Examiner* — Alicia Baturay
(74) *Attorney, Agent, or Firm* — Polsinelli P.C.

(57) ABSTRACT

Disclosed herein are methods of forwarding data over an IP network. The methods may include receiving a packet from a source host connected to the IP network, identifying the IP address of a destination host designated in the packet, determining the location on the IP network where the destination host designated by the packet is connected, without reference to the MAC address specified in the packet, by using location-identification information stored on the IP network, and forwarding the packet to the location on the IP network where the destination host is connected without reference to the MAC address specified in the packet. Also disclosed herein are related network devices implementing such techniques and operations, as well as IP networks which include such network devices.

20 Claims, 6 Drawing Sheets

Related U.S. Application Data continuation of application No. 14/301,239, filed on Jun. 10, 2014, now Pat. No. 10,951,522.

(60) Provisional application No. 61/900,228, filed on Nov. 5, 2013, provisional application No. 61/900,349, filed on Nov. 5, 2013.

(58) Field of Classification Search
USPC .......................................................... 709/238
See application file for complete search history.

(56) References Cited

U.S. PATENT DOCUMENTS 6,389,031 B1 5/2002 Chao et al.
6,677,831 B1 1/2004 Cheng et al.
6,714,553 B1 3/2004 Poole et al.
6,757,897 B1 6/2004 Shi et al.
6,876,952 B1 4/2005 Kappler et al.
6,907,039 B2 6/2005 Shen
6,941,649 B2 9/2005 Goergen
6,952,421 B1 10/2005 Slater
6,954,463 B1 10/2005 Ma et al.
6,996,099 B1 2/2006 Kadambi et al.
7,068,667 B2 6/2006 Foster et al.
7,152,117 B1 12/2006 Stapp et al.
7,177,946 B1 2/2007 Kaluve et al.
7,372,857 B1 5/2008 Kappler et al.
7,411,915 B1 8/2008 Spain et al.
7,426,604 B1 9/2008 Rygh et al.
7,516,211 B1 4/2009 Gourlay et al.
7,539,131 B2 5/2009 Shen
7,580,409 B1 8/2009 Swenson et al.
7,630,368 B2 12/2009 Tripathi et al.
7,729,296 B1 6/2010 Choudhary
7,826,469 B1 11/2010 Li et al.
8,233,384 B2 7/2012 Osterhout et al.
8,302,301 B2 11/2012 Lau
8,325,459 B2 12/2012 Mutnury et al.
8,339,973 B1 12/2012 Pichumani et al.
8,378,223 B1 2/2013 Shiue et al.
8,416,692 B2 4/2013 Patel et al.
8,442,063 B1 5/2013 Zhou et al.
8,499,093 B2 7/2013 Grosser et al.
8,514,712 B1 8/2013 Aswadhati
8,687,629 B1 4/2014 Kompella et al.
8,837,476 B2 9/2014 Banavalikar et al.
8,868,766 B1 10/2014 Theimer et al.
8,908,691 B2 12/2014 Biswas et al.
9,014,191 B1 4/2015 Mandal et al.
9,036,481 B1 5/2015 White
9,106,508 B2 8/2015 Banavalikar et al.
9,178,715 B2 11/2015 Jain et al.
9,197,551 B2 11/2015 DeCusatis et al.
9,203,188 B1 12/2015 Siechen et al.
9,258,195 B1 2/2016 Pendleton et al.
9,300,483 B2 3/2016 Banavalikar et al.
9,319,335 B1 4/2016 Tripathi
9,325,524 B2 4/2016 Banavalikar et al.
9,374,294 B1 6/2016 Pani
9,397,942 B2 7/2016 Song
9,397,943 B2 7/2016 Song
9,402,470 B2 8/2016 Shen et al.
9,407,501 B2 8/2016 Yadav et al.
9,426,060 B2 8/2016 Dixon et al.
9,433,081 B1 8/2016 Xiong et al.
9,444,634 B2 9/2016 Pani et al.
9,502,111 B2 11/2016 Dharmapurikar et al.
9,509,092 B2 11/2016 Shen et al.
9,544,185 B1 1/2017 Yadav et al.
9,544,224 B2 1/2017 Chu et al.
9,590,914 B2 3/2017 Alizadeh et al.
9,627,063 B2 4/2017 Dharmapurikar et al.
9,634,846 B2 4/2017 Pani
9,635,937 B2 5/2017 Shen et al.
9,654,300 B2 5/2017 Pani
9,654,385 B2 5/2017 Chu et al.
9,654,409 B2 5/2017 Yadav et al.
9,655,232 B2 5/2017 Saxena et al.
9,667,431 B2 5/2017 Pani
9,667,541 B2 5/2017 Song
9,667,551 B2 5/2017 Edsall et al.
9,674,086 B2 6/2017 Ma et al.
9,686,180 B2 6/2017 Chu et al.
9,698,994 B2 7/2017 Pani
9,716,665 B2 7/2017 Alizadeh et al.
9,742,673 B2 8/2017 Banerjee et al.
9,755,960 B2 9/2017 Moisand et al.
9,755,965 B1 9/2017 Yadav et al.
9,769,078 B2 9/2017 Attar et al.
9,876,711 B2 1/2018 Chu et al.
9,876,715 B2 1/2018 Edsall et al.
9,888,405 B2 2/2018 Edsall et al.
10,089,127 B2 10/2018 Padmanabhan et al.
10,951,522 B2 * 3/2021 Merchant .............. H04L 61/103
12,244,496 B2 * 3/2025 Merchant .............. H04L 61/103
2002/0126671 A1 9/2002 Ellis et al.
2002/0136268 A1 9/2002 Gan et al.
2002/0146026 A1 10/2002 Unitt et al.
2003/0035385 A1 2/2003 Walsh et al.
2003/0058837 A1 3/2003 Denney et al.
2003/0058860 A1 3/2003 Kunze et al.
2003/0067924 A1 4/2003 Choe et al.
2003/0097461 A1 5/2003 Barham et al.
2003/0115319 A1 6/2003 Dawson et al.
2003/0137940 A1 7/2003 Schwartz et al.
2003/0142629 A1 7/2003 Krishnamurthi et al.
2003/0174650 A1 9/2003 Shankar et al.
2003/0223376 A1 12/2003 Elliott et al.
2003/0231646 A1 12/2003 Chandra et al.
2004/0062259 A1 4/2004 Jeffries et al.
2004/0073715 A1 4/2004 Folkes et al.
2004/0100901 A1 5/2004 Bellows
2004/0103310 A1 5/2004 Sobel et al.
2004/0111507 A1 6/2004 Villado et al.
2004/0160956 A1 8/2004 Hardy et al.
2004/0249960 A1 12/2004 Hardy et al.
2005/0007961 A1 1/2005 Scott et al.
2005/0013280 A1 1/2005 Buddhikot et al.
2005/0073958 A1 4/2005 Atlas et al.
2005/0091239 A1 4/2005 Ward et al.
2005/0175020 A1 8/2005 Park et al.
2005/0201375 A1 9/2005 Komatsu et al.
2005/0207410 A1 9/2005 Adhikari et al.
2005/0213504 A1 9/2005 Enomoto et al.
2005/0232227 A1 10/2005 Jorgenson et al.
2006/0028285 A1 2/2006 Jang et al.
2006/0031643 A1 2/2006 Figueira
2006/0075093 A1 4/2006 Frattura et al.
2006/0083179 A1 4/2006 Mitchell
2006/0083256 A1 4/2006 Mitchell
2006/0182036 A1 8/2006 Sasagawa et al.
2006/0198315 A1 9/2006 Sasagawa et al.
2006/0209688 A1 9/2006 Tsuge et al.
2006/0209702 A1 9/2006 Schmitt et al.
2006/0215572 A1 9/2006 Padhye et al.
2006/0215623 A1 9/2006 Lin et al.
2006/0221835 A1 10/2006 Sweeney
2006/0239204 A1 10/2006 Bordonaro et al.
2006/0250982 A1 11/2006 Yuan et al.
2006/0268742 A1 11/2006 Chu et al.
2006/0274657 A1 12/2006 Olgaard et al.
2006/0280179 A1 12/2006 Meier
2006/0285500 A1 12/2006 Booth, III et al.
2007/0016590 A1 1/2007 Appleby et al.
2007/0025241 A1 2/2007 Nadeau et al.
2007/0053303 A1 3/2007 Kryuchkov
2007/0058557 A1 3/2007 Cuffaro et al.
2007/0061451 A1 3/2007 Villado et al.
2007/0076605 A1 4/2007 Cidon et al.
2007/0091795 A1 4/2007 Bonaventure et al.
2007/0097872 A1 5/2007 Chiu
2007/0159987 A1 7/2007 Khan et al.
2007/0160073 A1 7/2007 Toumura et al.
2007/0211625 A1 9/2007 Liu et al.

(56) References Cited

U.S. PATENT DOCUMENTS

2007/0223372 A1 9/2007 Haalen et al.
2007/0233847 A1 10/2007 Aldereguia et al.
2007/0258382 A1 11/2007 Foll et al.
2007/0258383 A1 11/2007 Wada
2007/0274229 A1 11/2007 Scholl et al.
2007/0280264 A1 12/2007 Milton et al.
2008/0031130 A1 2/2008 Raj et al.
2008/0031146 A1 2/2008 Kwak et al.
2008/0031247 A1 2/2008 Tahara et al.
2008/0092213 A1 4/2008 Wei et al.
2008/0147830 A1 6/2008 Ridgill et al.
2008/0151863 A1 6/2008 Lawrence et al.
2008/0177896 A1 7/2008 Quinn et al.
2008/0219173 A1 9/2008 Yoshida et al.
2008/0225853 A1 9/2008 Melman et al.
2008/0259809 A1 10/2008 Stephan et al.
2008/0259925 A1 10/2008 Droms et al.
2008/0310421 A1 12/2008 Teisberg et al.
2009/0052332 A1 2/2009 Fukuyama et al.
2009/0092136 A1 4/2009 Nazareth et al.
2009/0094357 A1 4/2009 Keohane et al.
2009/0103566 A1 4/2009 Kloth et al.
2009/0116402 A1 5/2009 Yamasaki
2009/0122805 A1 5/2009 Epps et al.
2009/0188711 A1 7/2009 Ahmad
2009/0193103 A1 7/2009 Small et al.
2009/0225671 A1 9/2009 Arbel et al.
2009/0232011 A1 9/2009 Li et al.
2009/0268614 A1 10/2009 Tay et al.
2009/0271508 A1 10/2009 Sommers et al.
2009/0307334 A1 12/2009 Maltz et al.
2010/0128619 A1 5/2010 Shigei
2010/0150155 A1 6/2010 Napierala
2010/0189080 A1 7/2010 Hu et al.
2010/0191813 A1 7/2010 Gandhewar et al.
2010/0191839 A1 7/2010 Gandhewar et al.
2010/0223655 A1 9/2010 Zheng
2010/0260197 A1 10/2010 Martin et al.
2010/0287227 A1 11/2010 Goel et al.
2010/0299553 A1 11/2010 Cen
2010/0312875 A1 12/2010 Wilerson et al.
2011/0110241 A1 5/2011 Atkinson et al.
2011/0138310 A1 6/2011 Gomez et al.
2011/0158248 A1 6/2011 Vorunganti et al.
2011/0170426 A1 7/2011 Kompella et al.
2011/0203834 A1 8/2011 Yoneya et al.
2011/0228795 A1 9/2011 Agrawal et al.
2011/0249682 A1 10/2011 Kean et al.
2011/0268118 A1 11/2011 Schlansker et al.
2011/0286447 A1 11/2011 Liu
2011/0299406 A1 12/2011 Vobbilisetty et al.
2011/0310738 A1 12/2011 Lee et al.
2011/0321031 A1 12/2011 Dournov et al.
2012/0007688 A1 1/2012 Zhou et al.
2012/0063318 A1 3/2012 Boddu et al.
2012/0102114 A1 4/2012 Dunn et al.
2012/0147752 A1 6/2012 Ashwood-Smith et al.
2012/0163396 A1 6/2012 Cheng et al.
2012/0195233 A1 8/2012 Wang et al.
2012/0275304 A1 11/2012 Patel et al.
2012/0281697 A1 11/2012 Huang
2012/0300787 A1 11/2012 Korger
2012/0314581 A1 12/2012 Rajamanickam et al.
2013/0055155 A1 2/2013 Wong et al.
2013/0090014 A1 4/2013 Champion
2013/0097335 A1 4/2013 Jiang et al.
2013/0124708 A1 5/2013 Lee et al.
2013/0182712 A1 7/2013 Aguayo et al.
2013/0227108 A1 8/2013 Dunbar et al.
2013/0250951 A1 9/2013 Koganti
2013/0311663 A1 11/2013 Kamath et al.
2013/0311991 A1 11/2013 Li et al.
2013/0322258 A1 12/2013 Nedeltchev et al.
2013/0322446 A1 12/2013 Biswas et al.
2013/0322453 A1 12/2013 Allan
2013/0332399 A1 12/2013 Reddy et al.
2013/0332577 A1 12/2013 Nakil et al.
2013/0332602 A1 12/2013 Nakil et al.
2014/0006549 A1 1/2014 Narayanaswamy et al.
2014/0016501 A1 1/2014 Kamath et al.
2014/0043535 A1 2/2014 Motoyama et al.
2014/0043972 A1 2/2014 Li et al.
2014/0047264 A1 2/2014 Wang et al.
2014/0050223 A1 2/2014 Foo et al.
2014/0056298 A1 2/2014 Vobbilisetty et al.
2014/0064281 A1 3/2014 Basso et al.
2014/0068750 A1 3/2014 Tjahjono et al.
2014/0086253 A1 3/2014 Yong
2014/0092907 A1 4/2014 Sridhar et al.
2014/0105039 A1 4/2014 Mcdysan
2014/0105062 A1 4/2014 Mcdysan et al.
2014/0105216 A1 4/2014 Mcdysan
2014/0146817 A1 5/2014 Zhang
2014/0146824 A1 5/2014 Angst et al.
2014/0201375 A1 7/2014 Beereddy et al.
2014/0219275 A1 8/2014 Allan et al.
2014/0241353 A1 8/2014 Zhang et al.
2014/0244779 A1 8/2014 Roitshtein et al.
2014/0269705 A1 9/2014 DeCusatis et al.
2014/0269712 A1 9/2014 Kidambi
2014/0307744 A1 10/2014 Dunbar et al.
2014/0321277 A1 10/2014 Lynn, Jr. et al.
2014/0328206 A1 11/2014 Chan et al.
2014/0334295 A1 11/2014 Guichard et al.
2014/0341029 A1 11/2014 Allan et al.
2014/0372582 A1 12/2014 Ghanwani et al.
2015/0009992 A1 1/2015 Zhang
2015/0010001 A1 1/2015 Duda et al.
2015/0010002 A1 1/2015 Duda et al.
2015/0092551 A1 4/2015 Moisand et al.
2015/0092593 A1 4/2015 Kompella
2015/0113143 A1 4/2015 Stuart et al.
2015/0124611 A1 5/2015 Attar et al.
2015/0124629 A1 5/2015 Pani
2015/0124631 A1 5/2015 Edsall et al.
2015/0124633 A1 5/2015 Banerjee et al.
2015/0124640 A1 5/2015 Chu et al.
2015/0124644 A1 5/2015 Pani
2015/0124806 A1 5/2015 Banerjee et al.
2015/0124817 A1 5/2015 Merchant et al.
2015/0124821 A1 5/2015 Chu et al.
2015/0124823 A1 5/2015 Pani et al.
2015/0124824 A1 5/2015 Edsall et al.
2015/0124825 A1 5/2015 Dharmapurikar et al.
2015/0124826 A1 5/2015 Edsall et al.
2015/0124832 A1 5/2015 Ma et al.
2015/0124833 A1 5/2015 Ma et al.
2015/0127797 A1 5/2015 Attar et al.
2015/0169351 A1 6/2015 Song
2015/0172190 A1 6/2015 Song
2015/0222543 A1 8/2015 Song
2015/0236900 A1 8/2015 Chung
2015/0378712 A1 12/2015 Cameron et al.
2015/0378969 A1 12/2015 Powell et al.
2016/0036697 A1 2/2016 DeCusatis et al.
2016/0119204 A1 4/2016 Murasato et al.
2016/0315811 A1 10/2016 Yadav et al.
2017/0085469 A1 3/2017 Chu et al.
2017/0207961 A1 7/2017 Saxena et al.
2017/0214619 A1 7/2017 Chu et al.
2017/0237651 A1 8/2017 Pani
2017/0237678 A1 8/2017 Ma et al.
2017/0250912 A1 8/2017 Chu et al.
2017/0346748 A1 11/2017 Attar et al.
2018/0276013 A1 9/2018 Chandrashekhar et al.

OTHER PUBLICATIONS

Aslam F., et al., “NPP: A Facility Based Computation Framework for Restoration Routing Using Aggregate Link Usage Information,” Proceedings of Quality of Service in Multiservice IP Network, Feb. 2005, pp. 150-163.

(56) References Cited

OTHER PUBLICATIONS

Chandy K.M., et al., "Distribution Snapshots: Determining Global States of Distributed Systems," ACM Transaction on Computer Systems, Feb. 1985, vol. 3, No. 1, pp. 63-75.
Extended European Search Report for European Application No. 19197861.8, mailed Dec. 3, 2019, 8 Pages.
Final Office Action for U.S. Appl. No. 14/099,742, dated Jun. 13, 2017, 23 Pages.
Final Office Action for U.S. Appl. No. 14/301,239, dated Feb. 5, 2019, 24 Pages.
Final Office Action for U.S. Appl. No. 14/301,239, dated Aug. 25, 2017, 32 Pages.
Final Office Action for U.S. Appl. No. 14/301,239, dated Jul. 22, 2020, 21 Pages.
Final Office Action for U.S. Appl. No. 14/530,550, dated Jan. 10, 2017, 19 Pages.
Final Office Action Issued in U.S. Appl. No. 14/099,742, dated Nov. 13, 2015.
Final Office Action Issued in U.S. Appl. No. 14/099,742, dated May 27, 2016.
Final Office Action issued in U.S. Appl. No. 14/301,239, dated Jun. 16, 2016, 41 Pages.
Final Office Action issued in U.S. Appl. No. 14/530,550, dated Jun. 23, 2016.
International Preliminary Report on Patentability for International Application No. PCT/US2014/063568, mailed May 19, 2016, 9 Pages.
International Search Report and Written Opinion for International Application No. PCT/US2014/063568, mailed Feb. 18, 2015, 11 Pages.
Khasnabish B., et al., "Mobility and Interconnection of Virtual Machines and Virtual Network Elements," Network Working Group Internet—Draft, Dec. 30, 2012, Retrieved from URL: draft-khasnabish-vmmi-problems-03.txt, XP015089268, 29 Pages.
Kodialam M., et al., "Dynamic Routing of Locally Restorable Bandwidth Guaranteed Tunnels Using Aggregated Link Usage Information," Proceedings of IEEE Infocom, vol. 1, 2001, pp. 376-385.
Li L., et al., "Routing Bandwidth Guaranteed Paths with Local Restoration in Label Switched Networks," IEEE Journal on Selected Areas in Communications, vol. 23, No. 2, Feb. 7, 2005, pp. 1-11.
Mahalingam M., et al., "VXLAN: A Framework for Overlaying Virtualized Layer 2 Networks Over Layer 3 Networks," Internet Engineering Task Force, Internet Draft, Oct. 2013, Retrieved from URL: https://tools.ietf.org/html/draft-mahalingam-dutt-dcops-vxlan-06, pp. 1-24.
Moncaster T., et al., "The Need for Congestion Exposure in the Internet: draft-moncaster-congestion-exposure-problem-03," Internet—Draft, Oct. 26, 2009, pp. 1-22.
Narten T., et al., "Problem Statement: Overlays for Network Virtualization: draft-ietf-nvo3-overlay-problem-statement-04," Internet Engineering Task Force, IRTF, Standard Working Draft, Internet Society (ISOC) 4, Rue Des Falaises Ch-1205 Geneva, Switzerland, Jul. 31, 2013, 24 pages, XP015093750.
Non-Final Office Action for U.S. Appl. No. 14/099,742, dated Oct. 28, 2016, 19 Pages.
Non-Final Office Action for U.S. Appl. No. 14/301,239, dated Dec. 31, 2019, 23 Pages.
Non-Final Office Action for U.S. Appl. No. 14/301,239, dated Feb. 10, 2017, 31 Pages.
Non-Final Office Action for U.S. Appl. No. 14/301,239, dated May 31, 2018, 24 Pages.
Non-Final Office Action for U.S. Appl. No. 14/530,550 dated May 22, 2017, 16 Pages.
Non-Final Office Action issued in U.S. Appl. No. 14/099,742, dated Jan. 29, 2016, 19 Pages.
Non-Final Office Action issued in U.S. Appl. No. 14/301,239, dated Nov. 5, 2015, 41 Pages.
Non-Final Office Action issued in U.S. Appl. No. 14/530,550, dated May 24, 2016, 24 Pages.
Office Action issued in U.S. Appl. No. 14/530,550, dated Dec. 26, 2015.
Office Action Issued in U.S. Appl. No. 14/099,742, dated May 6, 2015.
Office Action Issued in U.S. Appl. No. 14/099,742, dated Mar. 7, 2016.
Office Action Issued in U.S. Appl. No. 14/099,742, dated Dec. 21, 2015.
Pan P., et al., "Fast Reroute Extensions to RSVP-TE for LSP Tunnels," Network Working Group, RFC-4090, May 2005, pp. 1-38.
Raza S., et al., "Online Routing of Bandwidth Guaranteed Paths with Local Restoration Using Optimized Aggregate Usage Information," IEEE-ICC'05 Communications, May 2005, vol. 1, 8 pages.
Sinha S., et al., "Harnessing TCP's Burstiness with Flowlet Switching," Nov. 2004, 6 pages.
U.S. Appl. No. 14/086,803, titled "Hardware Based Fast Convergence for Network Failures," by Yadav et al., filed Nov. 21, 2013, 43 Pages.
U.S. Appl. No. 14/450,172, titled "Service Tag Switching," by Yadav N et al., filed Aug. 1, 2014, 45 Pages.
U.S. Appl. No. 14/530,550, titled "Network Fabric Overlay," by Edsall et al., filed Oct. 31, 2014, 90 Pages.

* cited by examiner

IP-BASED FORWARDING OF BRIDGED AND ROUTED IP PACKETS AND UNICAST ARP

CROSS-REFERENCES TO RELATED APPLICATIONS

This application is a continuation of U.S. Non-Provisional patent application Ser. No. 17/187,332, filed Feb. 26, 2021, entitled, "IP-BASED FORWARDING OF BRIDGED AND ROUTED IP PACKETS AND UNICAST ARP", which claims the benefit of U.S. Non-Provisional patent application Ser. No. 14/301,239, filed Jun. 10, 2014, entitled, "IP-BASED FORWARDING OF BRIDGED AND ROUTED IP PACKETS AND UNICAST ARP", which issued on Feb. 24, 2021 as U.S. Pat. No. 10,951,522, which claims the benefit of U.S. Provisional Patent Application No. 61/900,349, filed Nov. 5, 2013, entitled, "IP-BASED FORWARDING OF BRIDGED AND ROUTED IP PACKETS AND UNICAST ARP", and U.S. Provisional Patent Application No. 61/900,228, filed Nov. 5, 2013, entitled, "NETWORK FABRIC OVERLAY", the full disclosures of which are incorporated herein by reference in their entireties.

TECHNICAL FIELD

This disclosure relates to computer networking apparatuses and to methods and apparatuses for forwarding data on computer networks.

BACKGROUND

Modern data networks typically handle a tremendous and ever-increasing quantity of data transmission, and thus it is beneficial to implement techniques and specialized hardware which may reduce the amount of extraneous and/or unnecessary traffic flow in modern network architectures. However, despite the need for efficiency, current network architectures oftentimes employ various procedures which are far from optimal.

One such operation frequently used in traditional Later 3 networks is the so-called "address resolution protocol" or ARP. 'ARP-ing' is typically employed in both the bridging and routing context to facilitate communication between hosts as follows:

Generally, the process of initiating communication between source and destination hosts begins with the source host determining the IP address of the intended destination host through, for example, a 'domain name service' (DNS) hosted on a network-accessible server. Once the correct IP address is identified, a source host operating in a traditional Layer 3 network will decide whether a 'bridging' or 'routing' procedure will be used for forwarding packets to the destination host by assessing whether or not the destination host is located on the source host's own subnet (for example, by comparing the result of applying a subnet mask (255.255.255.0), to its own and the destination host's IP addresses).

If source and destination hosts are located on the same subnet and packets are to be 'bridged,' between hosts, the source host will employ ARP to determine the MAC address of the destination host which is needed to label the IP packets for forwarding. To determine the MAC address via ARP, the source host sends an ARP packet out onto its local subnet. The ARP packet is a Layer 2 broadcast packet. The relevant fields of a broadcast ARP packet are schematically illustrated in FIG. 1. All hosts on the local subnet receive the broadcast ARP packet and compare their own IP addresses with that of the target IP address listed in the broadcast ARP packet. The host on the local subnet having the IP address in question signals that it is the correct destination host through an ARP response packet it prepares by modifying the target MAC address field of the ARP packet with it's own MAC address. The relevant fields of an ARP response packet are schematically illustrated in FIG. 2. The ARP response packet is then forwarded back to the source host. The source host now has the destination MAC address it needs to properly label IP packets for forwarding to the intended destination host.

Again, this packet-forwarding procedure is known in the art as 'bridging' and works for packet-forwarding between source and destination hosts located on the same subnet. Note that in bridging, the source host was able to identify the Layer 2 MAC address of the destination host without employing the use of a router-type network device. Further note that once the source host learns the correct MAC address of the destination host, packets transmitted by the source arrive at the destination without intervening modification.

As stated above, if the source host determines that it is not connected on the same subnet as the destination host, a packet forwarding procedure known in the art as 'routing' is employed to forward packets instead of the 'bridging' procedure just described. Unlike bridging, routing does involve the use of a router (as its name implies), and furthermore, unlike bridging, does result in the modification of the original packet.

In a conventional routing procedure, since the source host has determined that the intended destination host is not connected on its local subnet, the source host forwards packets by setting their Layer 3 destination address field to the intended destination host's IP address, but setting their Layer 2 destination address field to that of the router's MAC address. If the source host doesn't know the router's MAC address, it first 'ARPs' for it by sending out a broadcast ARP request packet with Layer 3 destination address field set to the router's IP address. The router then responds with an ARP reply packet carrying the router's MAC address in essentially the same manner described above with respect to local hosts. As indicated, once the router's MAC address is known to the source host, the source host may begin forwarding packets to the destination host by labeling them with the destination host's IP address and the router's MAC address.

When the router receives packets labeled with the router's Layer 2 MAC address, but another host's Layer 3 IP address, the router consults its routing table to forward the packets. If the routing table indicates that the destination IP address is on another directly attached subnet, the router will consult an ARP table to check whether it has the MAC address of the host corresponding to the destination IP address. If it finds the MAC address, the router rewrites the packet's Layer 2 destination address field with this MAC address and forwards the packet to the destination host. If the router does not find the destination host's MAC address in its ARP table, the router ARPs for the destination host's MAC address before rewriting the packet's Layer 2 destination address field and forwarding the packet.

However, when the router receives a packet with its Layer 2 destination field set to its own MAC address, but with its Layer 3 destination field set to an IP address which, according to its routing table, is not in a directly attached subnet, the router determines if the destination host is accessible through another router. If so, the first router forwards the packet to the second router, rewriting the packet's Layer 2 destination address with this second router's MAC address. (If the first router doesn't know the second router's MAC address, it ARPs for it, in the same manner as the original source host used ARP to determine the first router's MAC address.) This process may repeat—and the packet may thus hop from router to router—until it arrives at a router having the intended destination host connected on one of its directly attached subnets (as indicated in that router's routing table).

Thus, a distinction between bridging and routing is typically maintained in the operation of a traditional network. When a packet is bridged by a network device, it is forwarded by the device on the network without modification of the original packet. This functionality is typically embodied in a device generally referred to in the art as a "switch." A "router" type network device, as distinct from a "switch," modifies packets prior to forwarding them, as illustrated by the routing technique just described. Thus, when a packet's destination host is on the same subnet as its source host, the packet is typically forwarded without modification via bridging, and when a packet's destination is on a different subnet than its source the packet is typically modified and forwarded via routing. In practice, it is oftentimes the case that network devices operate as both switches and routers, and thus the distinction between 'bridging' and 'routing' results in more complicated network devices which must typically have logic devoted to performing both functions, as well as logic devoted to performing a determination, in the first place, of whether to bridge or to route each incoming packet.

SUMMARY OF THE DISCLOSURE

Disclosed herein are methods of forwarding data over an IP network. The methods may include receiving a packet from a source host connected to the IP network, identifying the IP address of a destination host designated in the packet, determining the location on the IP network where the destination host designated by the packet is connected, without reference to the MAC address specified in the packet, by using location-identification information stored on the IP network, and forwarding the packet to the location on the IP network where the destination host is connected without reference to the MAC address specified in the packet. In some embodiments, the location-identification information may include a list matching one or more host IP addresses with one or more locations on the IP network where the hosts are connected.

Also disclosed herein are network devices for receiving packets from one or more source hosts connected to an IP network and forwarding the packets to one or more destination hosts connected to the IP network. In some embodiments, the network devices may include logic for receiving a packet from a source host connected to said network device, logic for identifying the IP address of a destination host designated in a received packet, logic for determining the location on the network where a destination host designated by a received packet is connected, without reference to the MAC address specified in the received packet, via look-up of the destination IP address in a list of location-identification information stored on the network, and logic for forwarding the received packet to the network device which is said location on the network.

Also disclosed herein are IP networks which include a first set of multiple network devices for connecting multiple hosts to the network, and a second set of multiple network devices for connecting together the first set of network devices. In some embodiments, the network devices in the first set may include logic for receiving a packet from a source host connected to said network device, logic for identifying the IP address of a destination host designated in a received packet, logic for attempting to determine the location on the network where a destination host designated by a received packet is connected, without reference to the MAC address specified in the received packet, via look-up of the destination IP address in a first list of location-identification information stored on the network, logic for labeling a received packet with said location, and logic for forwarding a received packet to a network device in the second set when said location is not the same network device in the first set having received the packet. In some embodiments, the network devices in the second set may include logic for receiving a packet from a network device in the first set, and forwarding the received packet to the network device in the first set which is the location of the destination host on the network designated in the packet.

BRIEF DESCRIPTION OF THE DRAWINGS

FIGS. 6A-1, 6A-2, and 6B schematically illustrate how a simple example of a 3-tier leaf-spine network may be built from just 4-port switches.

DETAILED DESCRIPTION

Figure 1A:
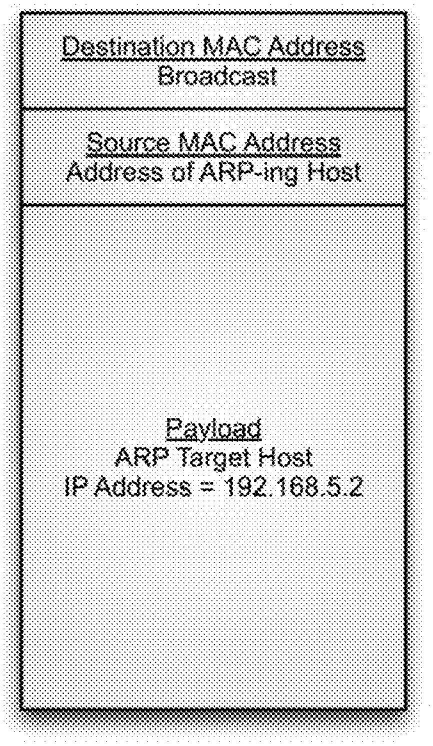
FIG. 1A schematically illustrates the format of an IP packet.

The distinctions maintained between bridging and routing in a traditional network, as described above, typically result in various complexities and inefficiencies in a standard implementation. One example is the ARP procedure used to determine host MAC addresses. As illustrated by the sequence described above, a significant disadvantage of employing the ARP procedure to determine host MAC addresses is that ARP request packets are broadcast to every host on a given subnet. Such broadcasts flood a network with traffic. In addition, depending on the topological connectivity of the various subnets on a network, broadcast loops may result. Although, routing protocols based on spanning-tree type algorithms may be used to eliminate the broadcast loops, in so doing, many optimal paths through the network's topology are oftentimes eliminated. Accordingly, it is desirable to avoid or minimize the generation of broadcast ARP packets on a network. Nevertheless, typical networks as implemented in current datacenters, do broadcast ARP requests, do eliminate loops using spanning-tree algorithms, etc., and do not employ effective techniques to minimize or eliminate the broadcasting problem associated with the ARP procedure.

To restate the issue another way: the current state of art is to forward IP Packets using combo switch-router network devices based on their destination MAC addresses and VLAN IDs if the packets arrive at a network device carrying a destination MAC address different than that of the router's (or if routing is simply not enabled on the network device), and otherwise, if the packet's destination MAC address does match that of the switch/router (and assuming routing is enabled), the switch/router forwards packets based on the destination IP addresses designated in the packets. However, as indicated above, a significant downside of this approach is that, in the former case, a source host typically utilizes an ARP procedure to discover the MAC addresses of its desired destination host on the local subnet—leading to inefficient flooding on the local subnet and imposing a significant burden on the end hosts who aren't interested in the flooded traffic. Thus, in current network implementations ARP requests are typically flooded to all the end devices in the flood domain (often a VLAN), unnecessarily sapping the processing power of the end devices on the local subnet. In fact, in some large modern datacenters, flooded traffic very frequently consumes a large portion of the potentially available server CPU processing power.

More generally, it is desirable to eliminate the distinction between switched/bridged IP packets (packets which carry the MAC address of the receiving switch-router) and routed IP packets (packets which carry a MAC address other than that of the receiving switch-router) so that packets entering a network may be treated uniformly, regardless of their ultimate destination. For example, eliminating the foregoing distinction allows the forwarding tables stored at network ingress points to have a smaller scale: e.g., devices that support both bridging and routing needed to support two sets of tables. One which stores host IP addresses and another which stores host MAC addresses (the latter of which is additionally problematic because they cannot be aggregated due to their lacking a hierarchical format).

Thus, network devices may operate, whenever possible, by forwarding packets based on the destination IP address (IPv4 or IPv6) designated in the packets that they receive. Note that "network device" should be understood to encompass both switches and routers, and also combo switch/routers (except where it is clear from the context that one particular type of device or another is being referred to), since the same physical device typically implements both switching/bridging functionality as well as routing functionality. As stated, IP-based forwarding may be performed by network devices for IP packets, and also, in some cases, for non-IP packets (example ARP family of protocols). In case of ARP packets, the network devices forward the packets based on the IP address inside the ARP payload after examining the ARP opcode (request or reply). In some embodiments, in order to preserve external semantical behavior for the benefit of hosts and/or network devices designed for legacy networks, although forwarding based on IP, the network devices may note whether a packet would have been routed or bridged. In the case of bridging in a legacy network (e.g., packet received by a network device labeled with a MAC address other than that of the network device, e.g., routing is disabled on a network device's ingress interface, etc.), the network device forwards the packet based on the IP address but does not perform the rewrite operations which might typically be associated with IP routing—rewrite of the source and destination MAC address fields, decrementing the TTL, etc. may be suppressed. On the other hand, if packets are such that a legacy network would expect them to be routed, the packets would be forwarded based on their IP address and the typical routing rewrite operations would be performed.

It is noted in the context of handling ARP request packets that various embodiments of the IP-based forwarding techniques disclosed herein may be particularly advantageous because: (i) they eliminate (or significantly reduces) one of the most common sources of broadcast or flooded traffic (which is especially important for cloud and data center networks); and (ii) they improve network scaling properties by allowing networks to operate with forwarding tables based on IP addresses along with local forwarding tables having the MAC addresses of locally attached hosts, rather than operating with forwarding tables which generally store an IP address and MAC address pair for all hosts/end devices connected to the network. Accordingly, in various embodiments, the foregoing ARP forwarding technique may provide benefits in that it may: (i) eliminate the need for external directory services, (ii) allow resolution of ARP requests in-line with regular packet flow to end hosts/devices, (iii) better distribute the burden of responding to ARP requests to the end devices targeted by the ARP requests, (iv) efficiently provide opportunities for end devices to update their ARP caches, (v) use remote station (top) and local station (bottom) table efficiently, i.e. reduce/eliminate need for learning MAC addresses, and (vi) allow source IP learning based on conversations (triggered by ARP).

Accordingly, disclosed herein are methods, network devices, and IP networks for forwarding packets of data based on the IP address of the destination host designated in the packets, rather than, and without reference to, the MAC addresses specified in the packets. Generally these packets are IP packets but, as described above, ARP request packets may also be forwarded in this manner since they do provide a destination IP address in their payloads, and by doing so, subnet-wide broadcast of ARP request packets may be avoided. For instance, certain such method embodiments are schematically illustrated by the flowchart in FIG. 2. As shown in the figure, in some embodiments, a method 200 of forwarding data over an IP network may include: receiving a packet from a source host connected to the IP network in operation 210, identifying the IP address of a destination host designated in the packet in operation 220, determining in operation 230 the location on the IP network where the destination host designated by the packet is connected, without reference to the MAC address specified in the packet, by using location-identification information stored on the IP network, and, finally, in operation 240, forwarding the packet to the location on the IP network where the destination host is connected, the forwarding to said location done without reference to the MAC address specified in the packet.

The location-identification information may reside in a database which may be implemented, for example, as a list which matches one or more host IP addresses with one or more locations on the IP network where the hosts are connected. Depending on the embodiment, such a list, or more generally, such a database of location-identification information, may be associated with (e.g., stored locally on) the network device receiving the packet as it enters the IP network—typically the first network device initially encountered by the packet when it reaches the IP network after it issues from the source host. In other embodiments, such a list or database may be associated with (e.g., stored on) another network device, or multiple other network devices on the IP network, or the database/list may be distributed across multiple network devices, or stored in-whole on one network device or devices while portions of the list/database may be locally-cached on other network devices. Examples will be illustrated below in the context of leaf-spine fabric overlay networks. Thus, depending on which network device has access to the relevant destination host identification-location information—e.g., a particular entry in the aforementioned list—the destination host's location on the network may be determined before or after the packet is forwarded from the first initially-encountered network device receiving the packet. For example, if the relevant destination host information is accessible from another network device, the packet may be forwarded to this second network device and, after said forwarding, the destination host's location on the network may be determined at this second network device.

In some embodiments, the IP network which implements the disclosed IP-based packet forwarding techniques may be a leaf-spine network fabric. Accordingly, presented below and provided in U.S. Provisional Pat. App. No. 61/900,228, filed Nov. 5, 2013, and titled "NETWORK FABRIC OVERLAY" (incorporated by reference in its entirety and for all purposes) are detailed descriptions of leaf-spine fabric overlay networks which, according to this disclosure, may employ mechanisms for forwarding incoming packets to destination hosts based on the destination IP addresses designated in the incoming packets, and in some embodiments, without reference to the destination MAC address designated in the incoming packets. Thus, for example, in the case of an ARP request packet, although in a legacy layer 2 network an ARP request packet is broadcast to all end devices on a local subnet, in various embodiments of the leaf-spine fabric overlay network set forth below and in U.S. Provisional Pat. App. No. 61/900,228, because an ARP request packet includes the intended destination host's IP address, and because network devices within the leaf-spine network fabric are aware of the locations where hosts are connected to the network, these network devices may forward ARP request packets to their intended destination hosts without broadcasting the ARP request packets within the fabric. A mapping database may keep the relevant location-identification information concerning the connection of end hosts to the leaf-spine network, in some embodiments, in the form of a list which matches one or more host IP addresses with one or more locations on the leaf-spine network where the hosts are connected.

Figure 2:
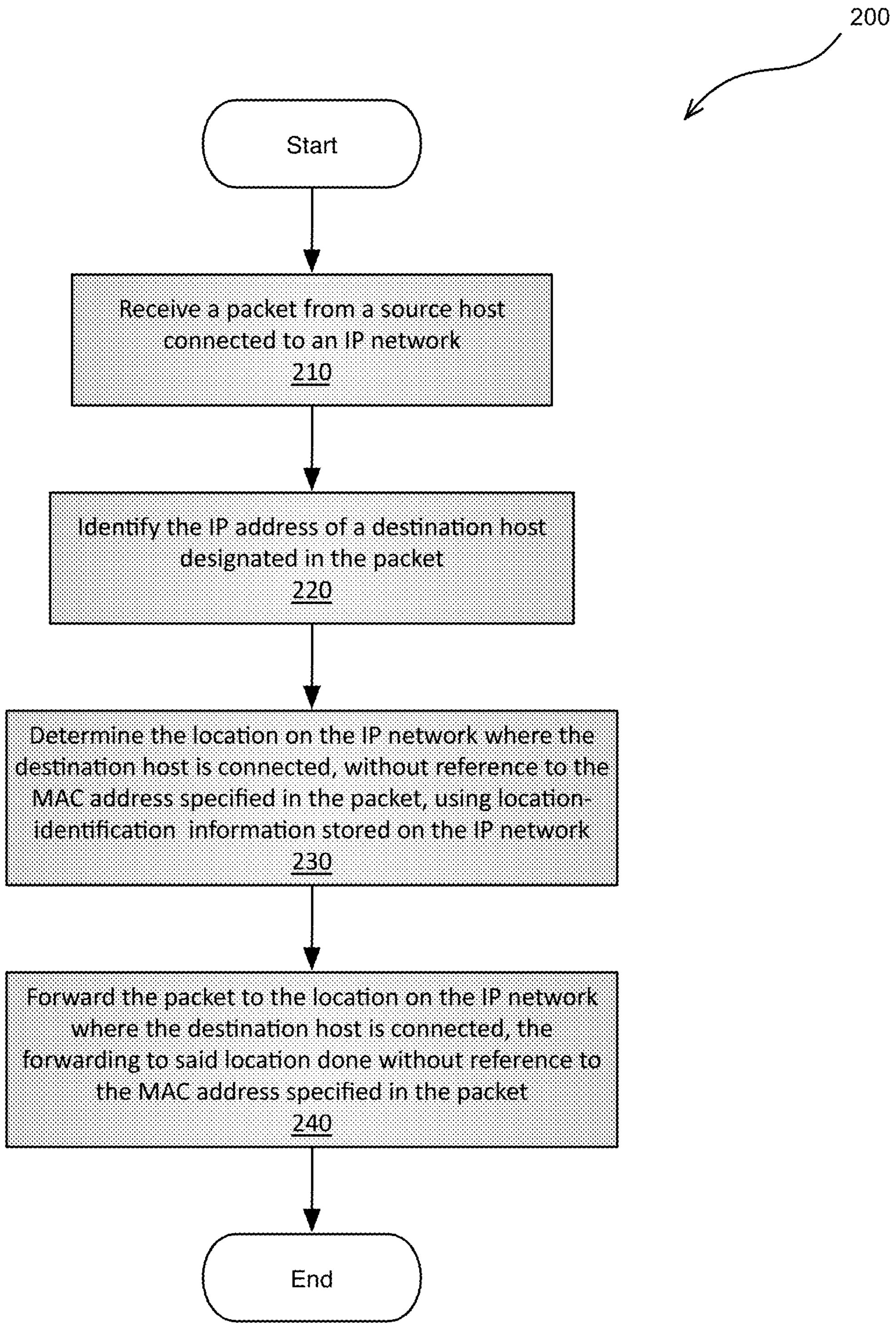
FIG. 2 is a flowchart schematically illustrating a sequence of operations for forwarding packets generated by a host connected to an IP network according to the disclosure provided herein.
Figure 3:
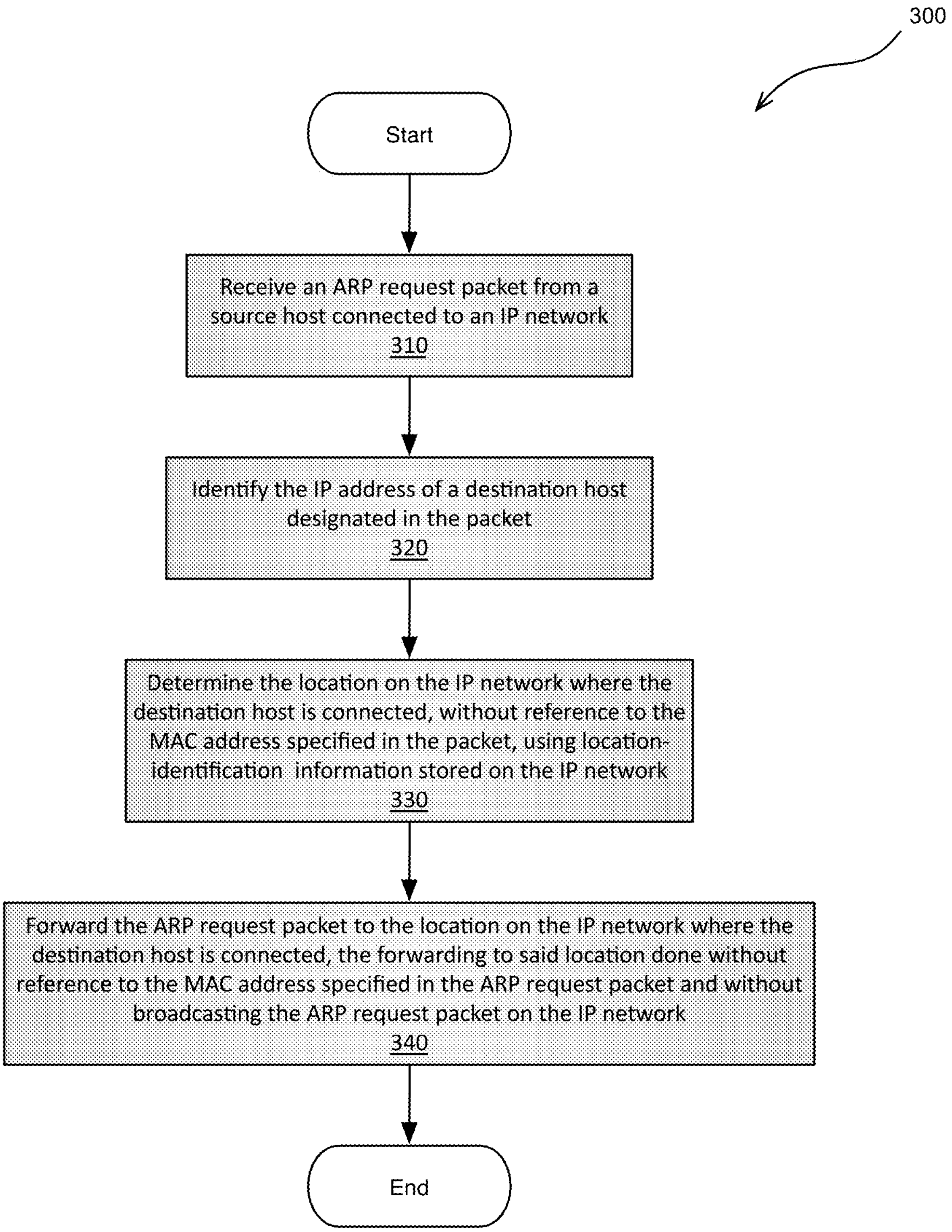
FIG. 3 is a flowchart schematically illustrating a sequence of operations for network response to an ARP packet generated by a host connected to the network according to the disclosure provided herein.

Thus, in the context of the leaf-spine fabric overlay networks described below and in U.S. Provisional Pat. App. No. 61/900,228, and referring again to FIG. 2, various IP-based packet forwarding methods 200 may include an operation 210 of receiving a packet from a source host connected to the IP network where the receiving is performed by a leaf network device in the fabric which serves as the initial network device encountered by the packet when it reaches the leaf-spine fabric overlay network after the packet issues from the source host. After receipt of the packet by the leaf network device, methods proceed as shown in FIG. 2 with operation 220 of identifying the IP address of a destination host designated in the packet, and then by operation 230 of determining the location on the IP network where the destination host designated by the packet is connected, without reference to the MAC address specified in the packet. In the context of leaf-spine fabric overlay networks, the location determined in operation 230 would typically be a leaf network device within the fabric of the leaf-spine network, although it could also be, for example, be a virtual switch device running within the overlay network's virtualization layer. After the location of the designated destination host is determined (by using location-identification information stored on the leaf-spine network), the packet is forwarded in operation 240 to the location within the leaf-spine IP network fabric where the destination host is connected, once again, the forwarding to said location done without reference to the MAC address specified in the packet. Typically (though not always—see below), in a leaf-spine fabric overlay network, the location where the destination host connects is a leaf network device which therefore serves as the packets egress point from the network.

It is noted that the IP-based forwarding techniques and operations disclosed herein may be used in connection with IP networks which provide a data abstraction layer oftentimes referred to as an overlay wherein packets are encapsulated with a packet encapsulation scheme/protocol such as VXLAN upon ingress to the network, and are de-encapsulated upon egress from the network. Examples of overlay networks in the context of leaf-spine network architectures utilizing a VXLAN encapsulation scheme/protocol are described in U.S. Provisional Pat. App. No. 61/900,228. Thus, in some embodiments, methods of IP-based packet forwarding may include applying an encapsulation to a packet after being received by the initial network device encountered by the packet as it reaches the network, and removing the encapsulation from the packet as it exits the IP network before it reaches the destination host. In the context of a leaf-spine fabric overlay network, the initially encountered network device is typically a leaf network device and so the encapsulation may be applied by this initially encountered leaf network device. However, it should be noted, or course, that IP-based packet forwarding techniques and operations do not require the existence of an overlay network in order to function and provide the benefits described above.

It should also be noted, particularly in the context of overlay networks, that in some embodiments, the location where the destination host connects may be a virtual switch device operating in a virtualization layer (running on an underlying physical host) and moreover that the destination host itself may be a virtual machine operating in the virtualization layer. (Note that virtualization in the context of a leaf-spine fabric overlay network is also described in detail in U.S. Provisional Pat. App. No. 61/900,228.) Likewise, in certain embodiments, the source host which issued the IP packet may be a physical host connected to a leaf network device which—as the initial network device encountered by the packet when it reaches the leaf-spine fabric overlay network—receives the packet and serves as the packet's ingress point to the network. And, likewise, in some embodiments, the source host may be a virtual machine operating in a virtualization layer (running on an underlying physical host), and the first network "device" in the fabric overlay network encountered by a packet after being issued from the source host may be a virtual switch device also running in the virtualization layer, which then serves as the packet's ingress point to the network.

Returning to the manner in which various IP-based packet forwarding methodologies' may access and utilize location-identification information: In some embodiments, the mapping database containing the location-identification information used for determining destination host location—e.g., a list matching host IP addresses with network locations—is associated with the leaf network devices, the spine network devices, with both types of devices, or with a third type of device which provides this information with respect to packets forwarded from a leaf or spine network device, or in some combination of the foregoing.

In certain such embodiments, a partial mapping database is associated with each leaf network device which may be a locally-cached subset of a full global location-identification mapping database associated with the spine network devices—in some embodiments, stored directly on each spine network device, and in other embodiments stored on a third type of network device which is associated with the spine network devices. Portions of the spine's global mapping database—which typically lists the location-identification information associated with every host connected to the network through each leaf network device—may be learned by the leaf network devices as the network operates, as described in U.S. Provisional Pat. App. No. 61/900,228 (incorporated by reference herein).

Thus, various embodiments of the IP-based forwarding techniques and operations disclosed herein work (in the ARP context or in the more general IP-based forwarding context) by looking-up an inbound packet's destination IP address in a mapping database associated locally with the leaf network device which receives the inbound packet. In such embodiments, the destination host's location on the network is determined at the initially encountered leaf network device before the packet is first forwarded from the initially encountered leaf network device. In other embodiments, the mapping database may be associated with a spine network device and therefore the destination host's location on the network is determined from a global mapping database associated with the spine network device after forwarding the packet from the leaf network device to a spine network device having access to this global mapping database. In yet other embodiments, the list may be associated with another type of network device—a proxy-function network device—which is associated with the spine network device receiving the packet, but which is used to perform the actual lookup/determination of the location of the correct destination host. In certain embodiments where packets are encapsulated upon ingress to the IP network, the encapsulation header (e.g., VXLAN header) carries a proxy address associated with or designating this proxy-function network device. The proxy-address may be carried in the destination address field of the encapsulation header, and after the packet is received at the proxy-function network device, said device may replace the proxy-address with the actual location/address on the network where the destination host connects. As mentioned above, whether the determination of destination host location is done at the initially encountered leaf network device or at a spine-network device (or proxy-function network device) after being forwarded from this leaf network device may depend on whether the destination host's location is present in the leaf network device's locally cached subset of the global mapping database associated with the spine. In any event, mapping database(s) which have the relevant location-identification information are employed in the foregoing manner to determine the location within an IP network where a given destination host is located and connected.

To further facilitate an understanding of mapping database usage in IP-based forwarding operations performed in the context of leaf-spine network architectures, a brief description of these architectures is now provided. A more detailed description is provided further below.

Figure 4:
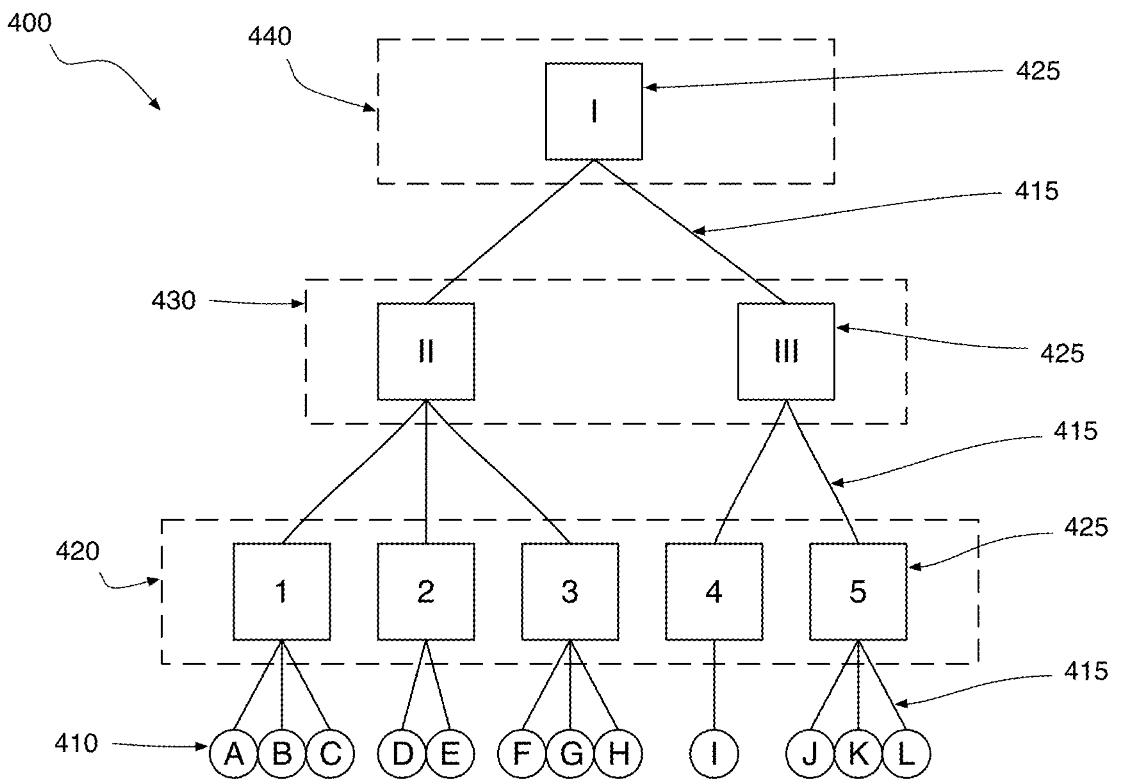
FIG. 4 schematically illustrates a simple network made up of 12 end devices which, following the "access-aggregation-core" (AAC) model, are connected through an access tier, an aggregation tier, and a top-level core tier.
Figure 5:
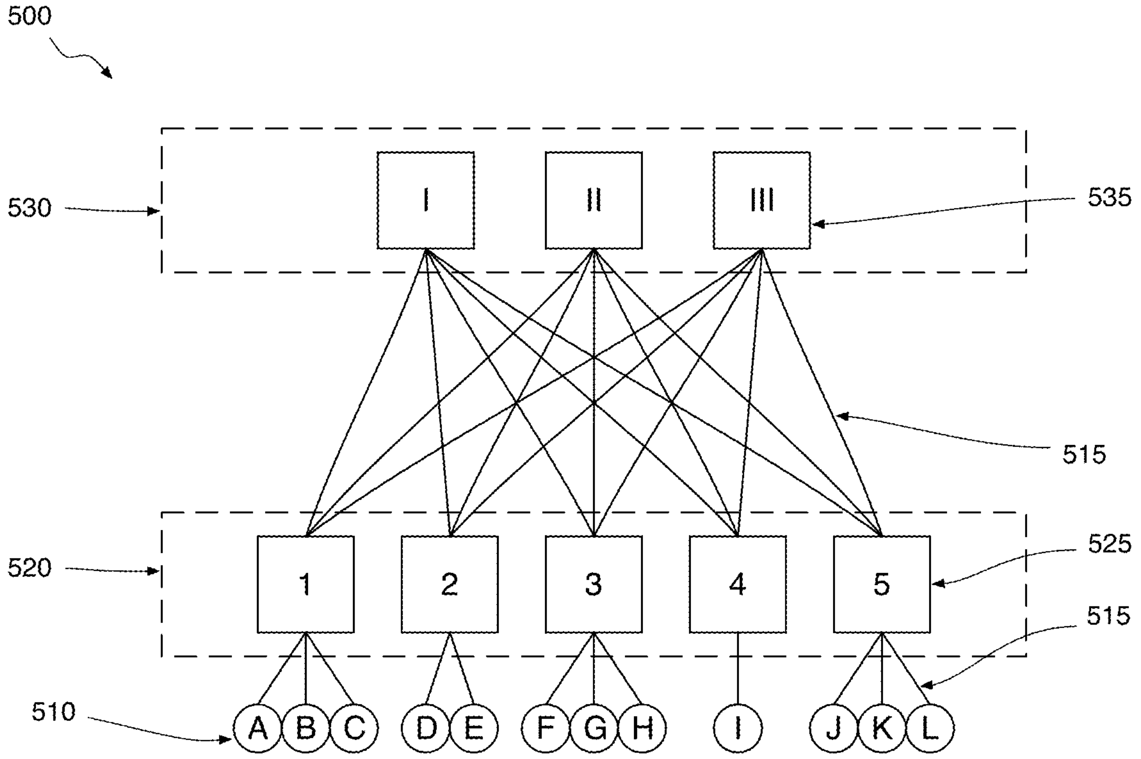
FIG. 5 schematically illustrates a particular example of a basic leaf-spine network.

FIGS. 4 and 5 collectively present a comparison between a traditional "access-aggregation-core" (ACC) network 400 and a simple leaf-spine network 500. Both networks consist of 12 end hosts connected together via 8 network devices. In particular, FIG. 4 schematically illustrates an ACC network of 12 end devices/hosts 410 (e.g., servers) connected through an access tier 420, an aggregation tier 430, and a top-level core tier 440. The network devices 425 within each tier (e.g., ethernet switches) control the flow of network traffic over the various links 415 (e.g., ethernet cable) between it and the other network devices 425, and ultimately to and from end devices/hosts 110. As shown in FIG. 4, it is access tier 420 which provides each end device 410 with immediate access to the network. From there, traffic may pass to the aggregation tier 430, and then to the core tier 440, depending on its final destination.

The basic leaf-spine network 500 presented in FIG. 5 resembles (to a certain extent) the AAC network 400 of FIG. 4. As with ACC network 400, leaf-spine network 500 provides connectivity for 12 end devices which directly connect to 5 network devices in a first tier. In the case of leaf-spine network 500, the 12 hosts connect to the 5 leaf network devices 525 of leaf tier 520, which are analogous to the 5 network devices 425 of the access tier 420 of the AAC network 400. However, moving on to the second tier, unlike the AAC network 400 which has a 2-network device aggregation tier 430 and a 1-network device core tier 440, the leaf-spine network 500 employs just a single additional tier, the spine tier 530, which consists of 3 spine-network devices 535. A detailed comparison of these two network architectures is presented below. In addition, FIGS. 6A-1, 6A-2, and 6B described below schematically illustrate the formation of leaf-spine networks having more than two tiers. Here, it is sufficient to generally note that a benefit of the leaf-spine architecture is that it is less hierarchical than its traditional ACC counterpart. For instance, in ACC network 400, depending on source and destination end hosts 410 involved, traffic may be routed through the single network device 425 in core tier 440, whereas in the leaf-spine network 500, traffic may be routed between any combination of end hosts 510 connected to leaf network devices 525 through several different spine network devices 535 in the spine tier 530.

Figure 7:
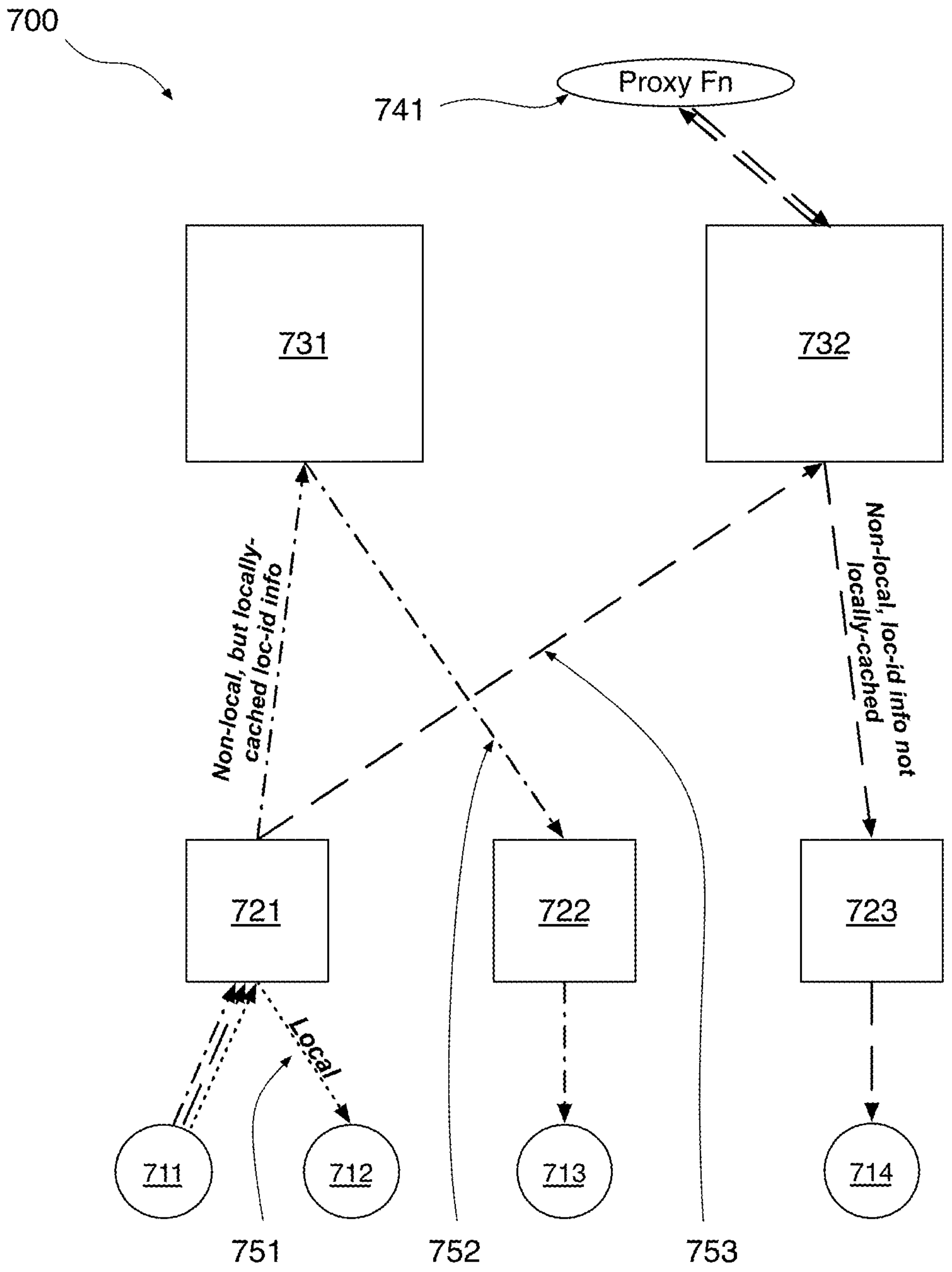
FIG. 7 schematically illustrates a leaf-spine network wherein various IP-based packet forwarding operations are performed.

FIG. 7 schematically illustrates the operation of an IP-based packet forwarding technique in the context of a simple leaf-spine network 700 having 3 leaf network devices 721, 722, 723 and 2 spine network devices 731, 732 which collectively connect together 4 end hosts 711, 712, 713, 714. Note that for simplicity and unlike the preceding figures, the multitude of connections between the network devices are not drawn in, so as to not obscure the description of various paths through the fabric which follows below. Also shown in the figure as a component of network 700 is proxy-function network device 741. Note that while proxy-function network device 741 is shown communicating with spine network device 732, depending on the embodiment, it may also be used to determine the network locations of end hosts designated by packets routed through spine network device 731; or spine network device 731 may utilize a separate dedicated proxy-function network device.

Thus, among other things, FIG. 7 presents an IP network having a first set of multiple network devices (leaf network devices 721, 722, and 223) for connecting multiple hosts (711, 712, 713, 714) to the network, and a second set of multiple network devices (spine network devices 731, and 732) for connecting together the first set of network devices, and a third type/set of network device(s) (in this example, just one device, proxy-function network device 741) which in certain circumstances (described below) may provide the locations of destination hosts on the network. The particular embodiment schematically illustrated in FIG. 7 involves a leaf-spine architecture having local mapping databases associated with each leaf network device 721, 722, 723 each of which represents a locally-cached partial copy of a global mapping database associated with spine network devices 731, 732, utilized by the spine through proxy-function network device 741. Three paths through the fabric are illustrated in FIG. 7, 751 (dotted line), 752 (dotted-dashed line), and 753 (dashed line)—each of which represent the communication of a packet from source host 711 to one of three destination hosts, 712, 713, and 714, respectively.

In a typical embodiment, each leaf network device's locally-cached partial mapping database will contain entries for the end hosts directly connected to it. Hence, communication between end hosts 711 and 712, which are both directly connected to leaf network device 721, may be accomplished without involving the spine, as illustrated by path 751 labeled 'local' in FIG. 7. Thus, IP-based forwarding of this particular packet is accomplished with a local mapping database (e.g., list of location-identification information) associated with this initially encountered leaf network device 721, which is used to determine destination host 712's location on the network (e.g., its direct connection to leaf network device 721) so that the packet may be forwarded directly from leaf network device 721 to end host 712. In network architectures employing packet encapsulation (e.g., VXLAN), because packet forwarding between source and destination hosts connected to the same leaf network device only involves local forwarding and not communication through the fabric of the network to the spine, this local forwarding may be done without using packet encapsulation. Although an encapsulation could still be done, the encapsulation would be applied by leaf network device 721, for example, upon receipt of a packet from host 711, and then immediately removed before forwarding the packet to destination host 712. In other words, the encapsulated packet would not be transmitted, making the encapsulation effectively superfluous.

Path 752 shown in FIG. 7 schematically illustrates another packet communication through the fabric of leaf-spine network 700, this time between end hosts 711 and 713 which are not connected to the same leaf network device. As shown by path 752, in this instance, the packet does get routed through the spine—specifically spine network device 731. However, as indicated by path 752's label in the figure, although the communication of this packet is non-local to leaf network device 721, an entry for end host 713 was present in leaf network device 721's locally-cached mapping database, and so end host 713's location on the network (e.g., its connection to leaf network device 722) was determined prior to the packet leaving leaf network device 721, and without involving the proxy-function associated with the spine. Accordingly, as with the previous packet-forwarding instance, forwarding is accomplished through use of the local mapping database of the initially encountered leaf network device, which is used to determine the destination host's location before the packet is forwarded from the initially encountered leaf network device. In network architectures employing an encapsulation scheme (e.g., VXLAN), here the packet would be encapsulated by leaf network device 721 with the destination address field of the encapsulation header set to the address of leaf network device 722, the leaf network device connecting destination host 713 to the network.

Thus, FIG. 7 illustrates that in some embodiments, an IP network may include a first set of network devices (e.g., leaf network devices 721, 722, and 223) which have logic (e.g., implemented in hardware and/or software) for receiving a packet from a connected source host (e.g., 711, 712, 713, 714), logic for identifying the IP address of a destination host designated in a received packet, logic for attempting to determine the location on the network where a destination host designated by a received packet is connected (without reference to the MAC address specified in the received packet), logic for labeling the packet with this location, and logic for forwarding the packet to a network device in a second set of network devices (e.g., spine network devices 731, 732) when the determined location not local to network device having received the packet. Of course, FIG. 7 also illustrates that in some embodiments, an IP network may include this second set of network devices (e.g., spine network devices 731, and 732) each of which have logic for receiving packets from the network devices in the first set. Generally, the network devices in the first and second sets may employ logic (e.g., implemented in hardware and/or software) for performing any, many, or all of the operations appropriate for their function as discussed herein. Thus, for instance, the network devices of the first set may include logic for applying an encapsulation (e.g., a VXLAN encapsulation) before forwarding a packet to the spine, and logic for removing the encapsulation before forwarding the packet to end host from egress leaf network device, as described above.

Another packet's passage through the fabric is illustrated by path 753, which represents a communication between end hosts 711 and 714. In this instance, as with path 752, the communication between end hosts is non-local and involves multiple leaf network devices but, as indicated by the path 753's label in FIG. 7, the location-identification information associated with end host 714 is not found in the locally-cached mapping database associated with leaf network device 711. Hence, leaf network device 721 labels this packet with the location of the proxy-function network device 741—e.g., sets the destination address field of the encapsulation header to the proxy address in networks employing an encapsulation scheme (e.g., VXLAN)—and after this packet is forwarded to the spine—in this instance, to spine network device 732—the packet is forwarded to proxy-function network device 741. The proxy-function network device 721 then determines end host 714's location on the network (e.g., its connection to leaf network device 723) by looking up end host 714 in the global mapping database and replaces the contents of the packet header field designating the proxy-function location—e.g., the destination address field of the encapsulation header—with that of end host 714's network location. Thus, in this IP-based packet-forwarding embodiment, forwarding is accomplished utilizing a mapping database associated with spine network device 732 (via proxy-function network device 741) which is used to determine destination host 714's location on the network after the packet is initially forwarded from leaf network device 721 to the spine. In this embodiment, logic for identifying the IP address of the destination host designated in the received packet resides on the proxy-function network device 741, however in other embodiments, said logic may reside on the spine network device itself.

Thus, in some network architecture embodiments, if location-identification information corresponding to the destination IP address designated in an inbound packet is found in the local mapping database associated with the initial network device receiving the inbound packet, the packet will be forwarded accordingly—e.g., if the destination host is local to the leaf network device receiving the packet, the packet will be forwarded out a local port on the leaf network device to the destination host. However, if the destination host is remote from the ingress leaf network device, the packet will be encapsulated (e.g. with VXLAN), the encapsulation carrying the address of the remote leaf network device to which the destination host is connected, and sent towards an appropriate spine network device. In some embodiments, if there is a miss in the local mapping database (cache of location-identification information), the packet will be encapsulated with the proxy IP address and sent towards a spine network device that has the proxy function or is associated with a third type of network device providing the proxy function. The proxy function then operates to determine the location of the host on the network having the destination IP address designated in the received packet.

In any event, referring again to FIG. 7 and specifically to paths 752 and 753, once the location of the designated end host is determined, the spine network device having received the packet forwards the packet (whether an ARP request packet or an IP packet, generally) to the leaf network device which is the location on the IP network where the designated destination host is connected/attached. For the instance of path 752, the packet is forwarded from spine network device 731 to leaf network device 722, and likewise for path 753, the packet is forwarded from spine network device 732 to leaf network device 723 (after spine network device 732 receives the packet back from proxy-function network device 741). Finally, paths 752 and 753 illustrate their corresponding packets being forwarded from leaf network devices 722 and 723 to end hosts 713 and 714, respectively. In a network employing encapsulation, the encapsulation would typically be removed from the packet at this point—before forwarding from egress leaf network device to end host. However, in embodiments where the end host is a virtual server/machine running within a virtualization layer atop a physical host/server (e.g., running in a "hypervisor"), a virtual switch device (V-switch) within the virtualization layer may represent the packet's egress point from the overlay network and also the location on the network where the virtual host connects. Accordingly, in such an embodiment, packets would be un-encapsulated by this V-switch device. Once again, virtualization technology within the context of leaf-spine fabric overlay networks is described in detail in U.S. Provisional Pat. App. No. 61/900,228 (incorporated by reference herein). In embodiments where the designated destination host is a physical host/server, Layer 2 communication protocols may be used to complete the packet's final hop from the edge of the leaf-spine network fabric to the connected host. Thus, in some embodiments, after the packet is de-encapsulated, it may be labeled with the MAC address of the destination host, prior to forwarding to the destination host. The egress leaf network device would typically have this MAC address in its local forwarding table, along with the MAC addresses of any other physical hosts it connects to the leaf-spine fabric overlay network.

Figure 1B:
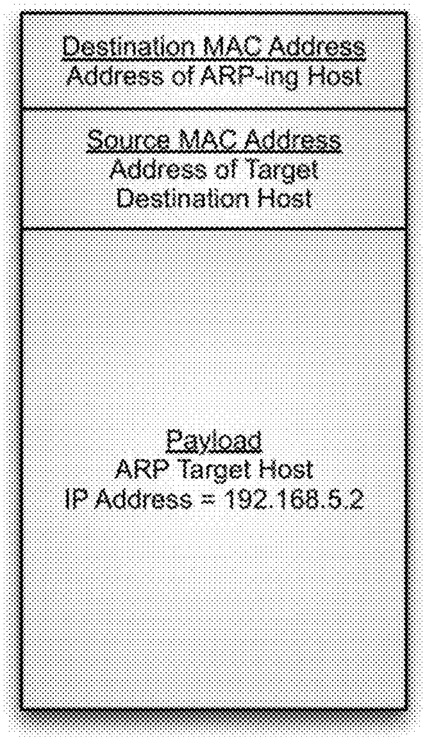
FIG. 1B schematically illustrates the format of an ARP packet.

As indicated above, the foregoing IP-based packet forwarding techniques and operations may be used to handle ARP request packets and prevent their broadcast (generation of broadcast loops, etc.) within the fabric of a leaf-spine network while preserving the external semantical behavior expected by hosts connected via Layer 2 to the network. In one embodiment, an ARP request packet may be forwarded via the IP-based forwarding techniques described above to the leaf network device which connects the end host having the IP address designated in the ARP request packet. At this point, in networks employing packet encapsulation, this leaf network device—since it serves as the ARP request packet's egress point from the network—may de-encapsulate the ARP request packet prior to forwarding the packet to target destination host designated in the packet. Note that if more than one host is connected on this interface of the leaf network device—the interface connecting the destination host—forwarding of the ARP packet out this interface effectively broadcasts the ARP packet out this interface since the ARP packet is now un-encapsulated and it's destination MAC address field is still labeled "broadcast" as shown in FIG. 1A (the same as it was upon ingress to the network through the initial leaf network device). In any event, the un-encapsulated ARP request packet reaches the destination host, and that host then prepares an ARP reply packet having its source MAC address field populated with the destination host's MAC address as shown in FIG. 1B. Note that the entire technique preserves, external to the network, Layer 2 ARP semantics as far as source and destination hosts are concerned. One advantage is that this provides the destination host an opportunity to respond to the ARP request packet, thereby allowing the whole ARP-ing procedure to serve as a "live-ness" check on the destination host by the source host. However, in other embodiments, the leaf network device which connects the destination host to the network may itself prepare an ARP response packet in reply to the ARP request packet, without notifying the attached target device, saving a potential forwarding step, but at the expense of the "live-ness" check. This may be done using a locally stored MAC address for the destination host present in a forwarding table associated with the leaf network device which identifies the MAC addresses of each attached/connected host and/or other device.

Accordingly, in some embodiments, a leaf network device in a leaf-spine network fabric may receive an ARP request packet from one of its attached hosts or other external devices which is labeled for broadcast. However, the leaf device prevents the packet's broadcasting by forwarding the packet based on the "target IP" address found in the payload of the packet, rather than in the conventional way by forwarding the packet based on the Layer 2 destination address, which is a broadcast address. To provide a specific, non-limiting example: host A connected to a leaf-spine fabric overlay network wants to communicate with host B also connected to the network, but host A does not know host B's MAC address. Host A therefore generates an ARP request packet and forwards it onto the network. The first network device receiving the ARP request packet is the leaf network device to which host A is attached. The ARP request packet includes the following information similarly to that shown in FIG. 1A:

L2 Destination MAC Address=Broadcast
L2 Source MAC address=Host A's MAC address
Payload Contains: Host B's IP Address The ingress leaf network device analyzes this ARP request packet and identifies Host B's IP address in the packet's payload. If this leaf network device determines from Host B's IP address that host B is locally connected to itself, this leaf network device forwards the packet directly to host B without encapsulating it. If the ingress leaf network device recognizes host B's IP address, but determines that it isn't a local IP address, this leaf network device encapsulates the packet and forwards it to the spine, the encapsulation identifying the IP address of the leaf network device connecting host B. If the ingress leaf network device does not recognize host B's IP address, this leaf network device produces an encapsulation identifying the IP address of a network device providing the proxy function as the destination IP address—either a spine network device or another class of network device which provides the proxy function—and forwards the packet to the spine—which then either applies the proxy function or forwards the packet to a proxy-function network device which applies the proxy function and forwards the packet back to the spine. With the packet's encapsulation now identifying the leaf network device connecting host B, the spine network device then sends the ARP request packet to this leaf network device. Note, once again, that the same forwarding procedure generally applies to other types of packets which specify a destination IP address.

In this example of an ARP request packet going from host A to host B, after forwarding from the spine, the receiving leaf network device recognizes the packet as an ARP request and recognizes host B's IP address. The receiving leaf network device may optionally update its forwarding table with information about host A. The leaf network device then forwards the packet to host B, which prepares and sends an ARP reply packet back to the leaf network device. The leaf network device now receives and forwards this ARP reply packet to the spine, which then routes the ARP reply to the leaf network device locally connecting host A. That leaf network device then de-encapsulates the ARP reply and forwards the ARP reply to host A. At this point, the leaf network device connecting host A may update its own forwarding table with information about host B.

Note that the gathering of the location-identification information for the mapping database cached at the leaf network devices may be done through protocols or through learning of the devices attached to the network, for example, as demonstrated in the preceding ARP example. The location-identification information in a local mapping database may include MAC and IP addresses of most or all locally connected host devices, however, as described above, these local mapping databases need not contain the MAC addresses of every host connected to every leaf network device on the network. In some embodiments as described above, the learned location-identification information may be provided in a mapping database resident on the spine, portions of which are locally-cached in the leaf network devices. Of course, it should also be noted that IP-based packet forwarding—whether applied to IP packets generally, or in the context of unicast ARP—may be implemented without an overlay network, and also in networks having other topologies besides the leaf-spine fabric now described in detail.

Detailed Description of Leaf-Spine Network Architectures Versus Traditional Network Architectures

A. Overview of Traditional "Access-Aggregation-Core" Network Architectures

Datacenter network design may follow a variety of topological paradigms—a given topology just referring to the system of networking lines/links which carry network traffic (i.e., data) and the networking switches, which control the flow of traffic over the lines/links in the network. One of the most common topological paradigms in use today is the aptly-named "access-aggregation-core" architecture. As the "core" part of the name suggests, such an architecture follows a hierarchical paradigm, wherein information traveling between hypothetical points A and B, first travel up the hierarchy away from point A and then back down the hierarchy towards point B.

FIG. 4 schematically illustrates a simple network 400 made up of 12 "end devices" 410 (e.g., servers) which, following the "access-aggregation-core" (AAC) model, are connected through an access tier 420, an aggregation tier 430, and a top-level core tier 440. Within each tier are "network devices" 425 (e.g., ethernet switches) each of which controls flow of network traffic over various "links" 415 (e.g., ethernet cable) between it and the other network devices 425 and ultimately to and from end devices 110. As shown in FIG. 4, it is access tier 420 which provides each end device 410 with immediate access to the network. From there, traffic may pass to the aggregation tier 430, and then to the core tier 440, depending on its final destination. It is noted that for traffic whose final destination is within the network 400 shown in FIG. 4, how far up the hierarchy the traffic must be directed to reach this destination depends on the location of the destination within the network. Traffic whose final destination is outside the network shown in FIG. 4—e.g., to some server on the worldwide internet—will typically travel all the way up the hierarchy, since the connection or connections to the outside internet typically reside in the core tier. It is also noted that while FIG. 4 portrays each network device 425 identically for purposes of illustration, actual hardware implementations of such devices may possess substantial differences depending on whether the device is located in the access tier 420, the aggregation tier 430, or the core tier 440. For one thing, the single network device in the core tier 440 of FIG. 4 would typically route more traffic (for the reasons just described) than those network devices in the other layers, and so it's hardware would be chosen accordingly. Moreover, differing hardware implementations in one tier versus another may be dictated by whether the devices in each tier do bridging or routing, or both. For instance, the access tier typically does only bridging, the aggregation tier a combination of bridging and routing—bridging and routing between interfaces going to the access tier and routing to all others—and the core tier, only routing. Note that the term "end device" 410 refers to a device connected to the network which is identified on the network and uses the network to communicate with other devices connected to the network. As such, the end device 410 may be personal computer, a workstation, a server, or a device which may not be a computer per se such as, for example, a network printer, scanner, network storage device, etc. Also note that while a computer, server, workstation, etc. may be a physical device having one or more processors (each potentially having one or more cores) connected to an array of random-access memory (RAM) and possibly a non-volatile storage medium (such as a magnetic disc, flash drive, optical disc, magnetic tape, etc.), an end device 410 may also be a virtual device, such as a virtualized server running in a virtualization environment—such as VMWare—atop an actual physical server. Finally, it is also noted that in some embodiments, what is designated as an "end device," may actually refer to multiple computers, the distinction being that for purposes of network topology they share the same connection to the network and therefore operate substantially as a single networked unit.

FIG. 4 illustrates the hierarchal connectivity of a access-aggregation-core (AAC) network model and shows that, from core to end device, the architecture follows a tree structure or graph—meaning that each network device within the network is only connected to a single device above it in the hierarchy, but is potentially connected to multiple network devices below it. The tree structure also implies, as seen from the figure, that there is a single unique path—i.e., sequence of links—connecting any two end devices on the network. However, though each pair of end devices is connected by a unique path, paths between different pairs of end devices may, but not necessarily, use the same links along some portion of their route. For example, with regards to the specific network shown in FIG. 4, the end devices 410 labeled A and F (hereinafter "end device A" and so forth) communicate over a path through network devices 1, II, and then 3. Likewise end devices I and J communicate over a path through network devices 4, III, and then 5, and so these two paths do not overlap (i.e. the paths have no links in common). However, if end device A instead communicates with end device K (while I communicates with J), then both paths pass through network devices III and 5 (and the link adjoining devices III and 5).

Shared usage of links and network devices (such as just described) leads to bottlenecks in a network exhibiting a tree structure architecture like the access-aggregation-core (AAC) network shown in FIG. 4. For sake of simplicity, assume that in a given AAC network, data transmission over each link and through each network device is limited to the same maximum data transmission rate, and that each end device on this network can send and receive data at this maximum rate as well. In other words, the same bandwidth limitation applies to the whole network. If this is so, then referring again to FIG. 4, end devices A and B are able to communicate at full bandwidth, while end devices I and J are also communicating at full bandwidth. However, to use the previous example, if end device A attempts to communicate with end device K while end device I is communicating with end device J, then "blocking" occurs—e.g., either both pairs of end devices communicate at half maximum bandwidth, or they communicate at full bandwidth sequentially, one pair waiting for the other pair to finish. Obviously, the situation becomes much worse in a AAC network if many end devices which are topologically-separate from each other (i.e., their communication paths involve many links) attempt to simultaneously communicate with one another at full bandwidth.

Though the blocking problem is an inevitable consequence of the tree-structure paradigm, various solutions have been developed within this paradigm to lessen the impact of the problem. One technique is to build redundancy into the network by adding additional links between high traffic nodes in the network. In reference to FIG. 4, this might mean adding extra links between the core tier network device I, and the aggregation tier network devices II and III. Split-ether channel and the like are examples implementing such an approach. Alternatively, instead of adding more links, standard-bandwidth links may be replaced by higher-bandwidth links, but the effect is essentially the same, albeit the consequences of link failure will be more severe versus having redundant links. With regards to link failure, it is noted in reference to FIG. 4 that even if redundant links are employed between the core and aggregation tiers, 1 link failure out of 4 in this simple example would reduce the network's bisectional bandwidth by a factor of 2. ("Bisectional bandwidth" is discussed in detail below.) Thus, it is evident that even with built-in redundancy, a tree-structured network architecture has inherent limitations, and, of course, there are costs associated with implementing hardware-based redundancy.

B. "Leaf-Spine" Network Architectures

Another way of addressing the ubiquitous "blocking" problem manifested in the modern datacenter's networking infrastructure is to design a new network around a topological paradigm where blocking does not present as much of an inherent problem. One such topology is often referred to as a "multi-rooted tree" topology (as opposed to a "tree"), which can be said to embody a full bi-partite graph if each spine network device is connected to each Leaf network device and vice versa. Networks based on this topology are oftentimes referred to as "Clos Networks," "flat networks," "multi-rooted networks," or just as "multi-rooted trees." In the disclosure that follows, a "leaf-spine" network architecture designed around the concept of a "multi-rooted tree" topology will be described. While it is true that real-world networks are unlikely to completely eliminate the "blocking" problem, the described "leaf-spine" network architecture, as well as others based on "multi-rooted tree" topologies, are designed so that blocking does not occur to the same extent as in traditional network architectures.

Roughly speaking, leaf-spine networks lessen the blocking problem experienced by traditional networks by being less hierarchical and, moreover, by including considerable active path redundancy. In analogy to microprocessor design where increased performance is realized through multi-core or multi-processor parallelization rather than simply by increasing processor clock speed, a leaf-spine network realizes higher performance, at least to a certain extent, by building the network "out" instead of building it "up" in a hierarchical fashion. Thus, a leaf-spine network in its basic form consists of two-tiers, a spine tier and leaf tier. Network devices within the leaf tier—i.e. "leaf network devices"—provide connections to all the end devices, and network devices within the spine tier—i.e., "spine network devices"—provide connections among the leaf network devices. Note that in a prototypical leaf-spine network, leaf network devices do not directly communicate with each other, and the same is true of spine network devices. Moreover, in contrast to an AAC network, a leaf-spine network in its basic form has no third core tier connecting the network devices within the second tier to a much smaller number of core network device(s), typically configured in a redundant fashion, which then connect to the outside internet. Instead, the third tier core is absent and connection to the internet is provided through one of the leaf network devices, again effectively making the network less hierarchical. Notably, internet connectivity through a leaf network device avoids forming a traffic hotspot on the spine which would tend to bog down traffic not travelling to and from the outside internet.

It should be noted that very large leaf-spine networks may actually be formed from 3 tiers of network devices. As described in more detail below, in these configurations, the third tier may function as a "spine" which connects "leaves" formed from first and second tier network devices, but a 3-tier leaf-spine network still works very differently than a traditional AAC network due to the fact that it maintains the multi-rooted tree topology as well as other features. To present a simple example, the top tier of a 3-tier leaf-spine network still does not directly provide the internet connection(s), that still being provided through a leaf network device, as in a basic 2-tier leaf-spine network.

FIG. 5 schematically illustrates a particular example of a basic leaf-spine network 500. To a certain extent, network 500 is analogous (or is the counterpart of) the AAC network 400 shown in FIG. 4. Both provide connectivity for 12 end devices which directly connect to 5 network devices in a first tier, in the case of network 500, to the 5 leaf network devices 525 of leaf tier 520, which are analogous to the 5 network devices 425 of the access tier 420 of the AAC network 400.

However, moving on to the second tier, unlike the AAC network 400 which has a 2-network device aggregation tier 430 and a 1-network device core tier 440, the leaf-spine network 500 employs just a single additional tier, the spine tier 530, which consists of 3 spine-network devices 535.

Though in FIGS. 4 and 5 the total number of network devices in the higher tiers remains the same, the connectivity of these devices is quite different. FIG. 5 shows that in a prototypical leaf-spine network, every leaf network device 525 is connected to multiple spine network devices 535 creating the so-called "multi-rooted tree" topology—differing from the ordinary tree topology of an AAC network where each network device is connected to only one network device above it in the hierarchy. As a consequence and unlike an AAC network, in a leaf-spine network there are multiple paths of communication between any pair of leaf network devices 525, and thus also between any pair of end devices 510 connected to different leaf network devices. The multi-path topology which joins the end devices in these networks is a characteristic which helps to reduce the extent to which "blocking" poses a problem. Moreover, leaf-spine networks are such that if a sufficient number of spine network devices are connected with sufficient bandwidth to the leaf network devices, a leaf-spine network may provide what is referred to as "full bisectional bandwidth," as described in more detail below. Furthermore, by adding additional tiers (such as a third tier as mentioned above and as described in greater detail below), a network of arbitrary size can be built that still provides "full bisectional bandwidth."

To illustrate, consider analogously to the example described above, communication between end device A and end device K simultaneous with communication between end devices I and J, which led to blocking in AAC network 400. As shown in FIG. 5, in the leaf-spine network 500, there are three paths connecting end device A with end device K and three different paths connecting end device I with end device J illustrating that no blocking problem arises. Again, assuming all links in the network provide equal bandwidth, the two pairs of end devices each have available 3 times the required bandwidth for max rate communication and thus the network is non-blocking in this scenario.

As a second example, consider the scenario of simultaneous communication between end devices A and F and between end devices B and G which will clearly also lead to blocking in AAC network 400. In the leaf-spine network 500, although two leaf network devices 525 are shared between the four end devices 510, specifically network devices 1 and 3, there are still three paths of communication between these two devices (one through each of the three spine network devices I, II, and III) and therefore there are three paths collectively available to the two pairs of end devices. Thus, it is seen that this scenario is also non-blocking (unlike FIG. 4) because each pair of end devices still has access to 1.5 times the bandwidth required for max rate communication.

As a third example, consider the scenario of simultaneous communication between three pairs of end devices—between A and F, between B and G, and between C and H. In AAC network 400, this results in each pair of end devices having ⅓ the bandwidth required for full rate communication, but in leaf-spine network 500, once again, since 3 paths are available, each pair has exactly the bandwidth it needs for full rate communication. Thus, in a leaf-spine network having single links of equal bandwidth connecting devices, as long as the number of spine network devices 535 is equal to or greater than the number of end devices 510 which may be connected to any single leaf network device 525, then the network will have enough bandwidth for simultaneous full-rate communication between the end devices connected to the network.

More generally, the extent to which a given network is non-blocking may be characterized by the network's "bisectional bandwidth," which is determined by dividing a network that has N end devices attached to it into 2 equal sized groups of size N/2, and determining the total bandwidth available for communication between the two groups. If this is done for all possible divisions into groups of size N/2, the minimum bandwidth over all such divisions is the "bisectional bandwidth" of the network. Based on this definition, a network may then be said to have "full bisectional bandwidth" and have the property of being "fully non-blocking" if each leaf network device's total uplink bandwidth to the spine tier 530 (the sum of the bandwidths of all links connecting the leaf network device 525 to any spine network device 535) is at least equal to the maximum downlink bandwidth to end devices associated with any of the leaf network devices on the network.

To be precise, when a network is said to be "fully non-blocking" it means that no "admissible" set of simultaneous communications between end devices on the network will block—the admissibility constraint simply meaning that the non-blocking property only applies to sets of communications that do not direct more network traffic at a particular end device than that end device can accept as a consequence of its own bandwidth limitations. Whether a set of communications is "admissible" may therefore be characterized as a consequence of each end device's own bandwidth limitations (assumed here equal to the bandwidth limitation of each end device's link to the network), rather than arising from the topological properties of the network per se. Therefore, subject to the admissibility constraint, in a non-blocking leaf-spine network, all the end devices on the network may simultaneously communicate with each other without blocking, so long as each end device's own bandwidth limitations are not implicated.

The leaf-spine network 500 thus exhibits full bisectional bandwidth because each leaf network device has at least as much bandwidth to the spine tier (i.e., summing bandwidth over all links to spine network devices) as it does bandwidth to the end devices to which it is connected (i.e., summing bandwidth over all links to end devices). To illustrate the non-blocking property of network 500 with respect to admissible sets of communications, consider that if the 12 end devices in FIG. 5 are arbitrarily divided into 6 pairs, simultaneous communications between the 6 pairs are admissible, and thus may occur without blocking in network 500. In addition, it is noted that the non-blocking property of leaf-spine network 500 will be preserved if up to 15 end devices are connected, 3 to each of the 5 leaf network devices.

To implement leaf-spine network 500, the leaf tier 520 would typically be formed from 5 ethernet switches of 6 ports or more, and the spine tier 530 from 3 ethernet switches of 5 ports or more. The number of end devices which may be connected is then the number of leaf tier switches j multiplied by ½ the number of ports non each leaf tier switch, or $\frac{1}{2}\cdot j\cdot n$, which for the network of FIG. 5 is $\frac{1}{2}\cdot 5\cdot 6=15$. Furthermore, the number of ports m on each spine tier switch is equal to the number of leaf tier switches j (so long as the maximum number of leaf tier switches are used), and so the total number of end devices is also given by ½·m·n, where m is the number of ports on the spine tier switches, and n is the number of ports on the leaf tier switches.

However, not every network is required to be non-blocking and, depending on the purpose for which a particular network is built and the network's anticipated loads, a fully non-blocking network may simply not be cost-effective. Nevertheless, leaf-spine networks still provide advantages over traditional networks, and they can be made more cost-effective, when appropriate, by reducing the number of devices used in the spine tier, or by reducing the link bandwidth between individual spine and leaf tier devices, or both. In some cases, the cost-savings associated with using fewer spine-network devices can be achieved without a corresponding reduction in bandwidth between the leaf and spine tiers by using a leaf-to-spine link speed which is greater than the link speed between the leaf tier and the end devices. If the leaf-to-spine link speed is chosen to be high enough, a leaf-spine network may still be made to be fully non-blocking—despite saving costs by using fewer spine network devices.

The extent to which a network having fewer spine tier devices is non-blocking is given by the ratio of bandwidth from leaf network device to spine tier versus bandwidth from leaf network device to end devices. By adjusting this ratio, an appropriate balance between cost and performance can be dialed in. In FIG. 5, for example, assuming links have equal bandwidth, one spine network device 535 could be eliminated if a non-blocking ratio of ⅔ was acceptable. This would imply that if 3 end devices connected to a single leaf network device attempt simultaneous communication to 3 or more end devices attached to other leaf networking devices, only ⅔ of the required bandwidth would be available. This is also referred to as "oversubscription." In this case, the "oversubscription rate" would be 1.5, since $1.5=(2/3)^{-1}$.

This concept of oversubscription and building cost-effective networks having fewer than optimal spine network devices also illustrates the improved failure domain provided by leaf-spine networks versus their traditional counterparts. In a traditional AAC network, if a device in the aggregation tier fails, then every device below it in the network's hierarchy will become inaccessible until the device can be restored to operation. Furthermore, even if redundancy is built-in to that particular device, or if it is paired with a redundant device, or if it is a link to the device which has failed and there are redundant links in place, such a failure will still result in a 50% reduction in bandwidth, or a doubling of the oversubscription. In contrast, redundancy is intrinsically built into a leaf-spine network and such redundancy is much more extensive. Thus, as illustrated by the usefulness of purposefully assembling a leaf-spine network with fewer spine network devices than is optimal, absence or failure of a single device in the spine (or link to the spine) will only typically reduce bandwidth by 1/k where k is the total number of spine network devices.

It is also noted once more that in some networks having fewer than the optimal number of spine network devices (e.g., less than the number of end devices connecting to the leaf network devices), the oversubscription rate may still be reduced (or eliminated) by the use of higher bandwidth links between the leaf and spine network devices relative to those used to connect end devices to the leaf network devices.

C. Example "Leaf-Spine" Network Architecture

The following describes a sample implementation of a leaf-spine network architecture. It is to be understood, however, that the specific details presented here are for purposes of illustration only, and are not to be viewed in any manner as limiting the concepts disclosed herein. With this in mind, leaf-spine networks may be implemented as follows:

Leaf network devices may be implemented as ethernet switches having: (i) 48 ports for connecting up to 48 end devices (e.g., servers) at data transmission speeds of 10 GB/s (gigabits per second)—i.e. 'downlink ports'; and (ii) 12 ports for connecting to up to 12 spine network devices at data transmission speeds of 40 GB/s—i.e. 'uplink ports.' Thus, each leaf network device has 480 GB/s total bandwidth available for server connections and an equivalent 480 GB/s total bandwidth available for connections to the spine tier. More generally, leaf network devices may be chosen to have a number of ports in the range of 10 to 50 ports, or 20 to 100 ports, or 50 to 1000 ports, or 100 to 2000 ports, wherein some fraction of the total number of ports are used to connect end devices ('downlink ports') and some fraction are used to connect to spine network devices ('uplink ports'). In some embodiments, the ratio of uplink to downlink ports of a leaf network device may be 1:1, or 1:2, or 1:4, or the aforementioned ratio may be in the range of 1:1 to 1:20, or 1:1 to 1:10, or 1:1 to 1:5, or 1:2 to 1:5. Likewise, the uplink ports for connection to the spine tier may have the same bandwidth as the downlink ports used for end device connection, or they may have different bandwidths, and in some embodiments, higher bandwidths. For instance, in some embodiments, uplink ports may have bandwidths which are in a range of 1 to 100 times, or 1 to 50 times, or 1 to 10 times, or 1 to 5 times, or 2 to 5 times the bandwidth of downlink ports.

Moreover, depending on the embodiment, leaf network devices may be switches having a fixed number of ports, or they may be modular, wherein the number of ports in a leaf network device may be increased by adding additional modules. The leaf network device just described having 48 10 GB/s downlink ports (for end device connection) and 12 40 GB/s uplink ports (for spine tier connection) may be a fixed-sized switch, and is sometimes referred to as a 'Top-of-Rack' switch. Fixed-sized switches having a larger number of ports are also possible, however, typically ranging in size from 50 to 150 ports, or more specifically from 64 to 128 ports, and may or may not have additional uplink ports (for communication to the spine tier) potentially of higher bandwidth than the downlink ports. In modular leaf network devices, the number of ports obviously depends on how many modules are employed. In some embodiments, ports are added via multi-port line cards in similar manner to that described below with regards to modular spine network devices.

Spine network devices may be implemented as ethernet switches having 576 ports for connecting with up to 576 leaf network devices at data transmission speeds of 40 GB/s. More generally, spine network devices may be chosen to have a number of ports for leaf network device connections in the range of 10 to 50 ports, or 20 to 100 ports, or 50 to 1000 ports, or 100 to 2000 ports. In some embodiments, ports may be added to a spine network device in modular fashion. For example, a module for adding ports to a spine network device may contain a number of ports in a range of 10 to 50 ports, or 20 to 100 ports. In this manner, the number of ports in the spine network devices of a growing network may be increased as needed by adding line cards, each providing some number of ports. Thus, for example, a 36-port spine network device could be assembled from a single 36-port line card, a 72-port spine network device from two 36-port line cards, a 108-port spine network device from a trio of 36-port line cards, a 576-port spine network device could be assembled from 16 36-port line cards, and so on.

Links between the spine and leaf tiers may be implemented as 40 GB/s-capable ethernet cable (such as appropriate fiber optic cable) or the like, and server links to the leaf tier may be implemented as 10 GB/s-capable ethernet cable or the like. More generally, links, e.g. cables, for connecting spine network devices to leaf network devices may have bandwidths which are in a range of 1 GB/s to 1000 GB/s, or 10 GB/s to 100 GB/s, or 20 GB/s to 50 GB/s. Likewise, links, e.g. cables, for connecting leaf network devices to end devices may have bandwidths which are in a range of 10 MB/s to 100 GB/s, or 1 GB/s to 50 GB/s, or 5 GB/s to 20 GB/s. In some embodiments, as indicated above, links, e.g. cables, between leaf network devices and spine network devices may have higher bandwidth than links, e.g. cable, between leaf network devices and end devices. For instance, in some embodiments, links, e.g. cables, for connecting leaf network devices to spine network devices may have bandwidths which are in a range of 1 to 100 times, or 1 to 50 times, or 1 to 10 times, or 1 to 5 times, or 2 to 5 times the bandwidth of links, e.g. cables, used to connect leaf network devices to end devices.

In the particular example of each spine network device implemented as a 576-port @ 40 GB/s switch and each leaf network device implemented as a 48-port @ 10 GB/s downlink & 12-port @ 40 GB/s uplink switch, the network can have up to 576 leaf network devices each of which can connect up to 48 servers, and so the leaf-spine network architecture can support up to 576·48=27,648 servers. And, in this particular example, due to the maximum leaf-to-spine transmission rate (of 40 GB/s) being 4 times that of the maximum leaf-to-server transmission rate (of 10 GB/s), such a network having 12 spine network devices is fully non-blocking and has full cross-sectional bandwidth.

As described above, the network architect can balance cost with oversubscription by adjusting the number of spine network devices. In this example, a setup employing 576-port switches as spine network devices may typically employ 4 spine network devices which, in a network of 576 leaf network devices, corresponds to an oversubscription rate of 3:1. Adding a set of 4 more 576-port spine network devices changes the oversubscription rate to 3:2, and so forth.

Datacenters typically consist of servers mounted in racks. Thus, in a typical setup, one leaf network device, such as the 'Top-of-Rack' device described above, can be placed in each rack providing connectivity for up to 48 rack-mounted servers. The total network then may consist of up to 576 of these racks connected via their leaf-network devices to a spine-tier rack containing between 4 and 12 576-port spine tier devices.

D. Leaf-Spine Network Architectures Formed From More Than Two Tiers of Network Devices The two-tier leaf-spine network architecture described above having 576-port @ 40 GB/s switches as spine network devices and 48-port @ 10 GB/s downlink & 12-port @ 40 GB/s uplink switches as leaf network devices can support a network of up to 27,648 servers, and while this may be adequate for most datacenters, it may not be adequate for all. Even larger networks can be created by employing spine tier devices with more than 576 ports accompanied by a corresponding increased number of leaf tier devices. However, another mechanism for assembling a larger network is to employ a multi-rooted tree topology built from more than two tiers of network devices—e.g., forming the network from 3 tiers of network devices, or from 4 tiers of network devices, etc.

Figures 1, 6A:
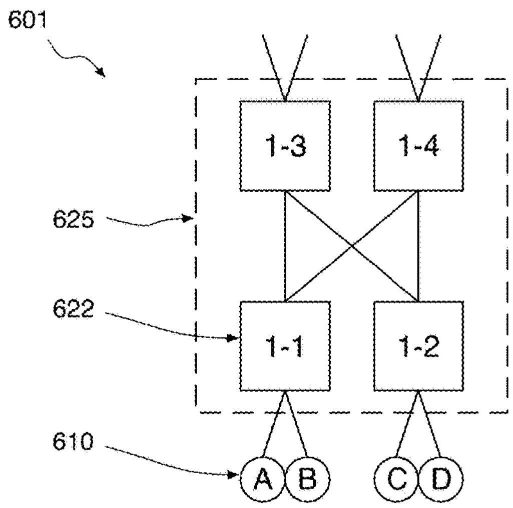
Figures 2, 6A:
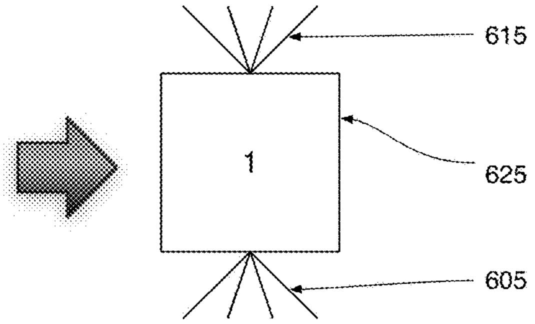

One simple example of a 3-tier leaf-spine network may be built from just 4-port switches and this is schematically illustrated in FIGS. 6A-1, 6A-2, and 6B, in order to convey the general principle. Of course, it is to be understood that to build a large 3-tier network, larger switches would be employed. FIG. 6A-1 shows 4 4-port switches 622 (labeled "1-1," "1-2," "13," "1-4") connected to form a 2-tier leaf-spine network 601 for connecting 4 end devices 610 (labeled "A," "B," "C," "D") with switches 1-1 and 1-2 serving as leaf network devices, and switches 1-3 and 1-4 serving as spine network devices. Note that a leaf-spine network assembled from 4-port switches would generally support a network of 8 end devices 610, connected through 2 spine-network devices and 4 leaf network devices, but here, half the ports on the switches serving as spine network devices, switches 1-3 and 1-4, have their links pointed upward in FIG. 6A-1 to schematically indicate these links are reserved for uplink connection to a third tier. With the 4 4-port switches 622 connected in this manner, they may collectively be viewed as functioning as an 8 port switch 625, as schematically illustrated in FIG. 6A-2 (and labeled "1"), with 4 downlinks 605 to potential end devices 610 and 4 uplinks 615 to a potential third tier. Such an effective 8-port switch may then serve as a building-block for a 3-tier leaf-spine network.

Figure 6B:
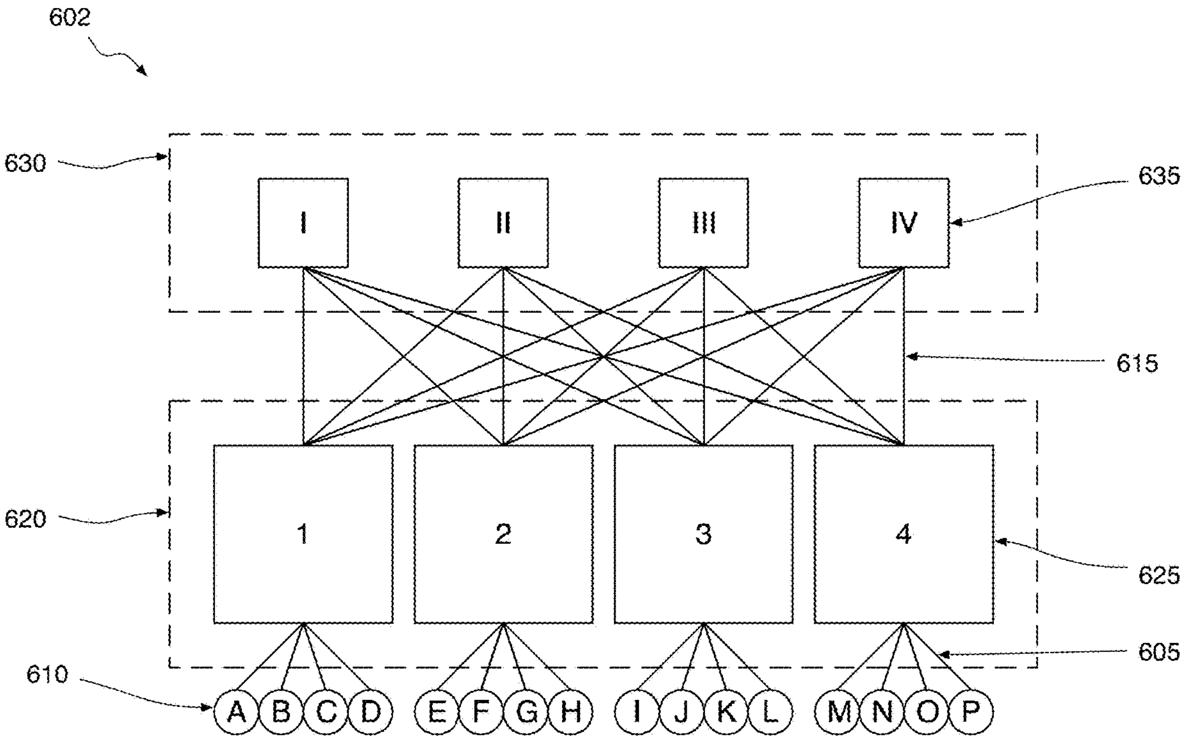

FIG. 6B then shows how a 3-tier leaf-spine network 602 may be assembled from these 8-port building blocks. As shown in the figure, 4 8-port building blocks 625 may effectively serve as 4 leaf-network devices (labeled "1," "2," "3," "4,") in the leaf tier 620 of network 602. The spine tier 630 of network 602 is formed from 4 additional 4-port switches 635 (labeled "I," "II," "III," "IV"), similar to those used to form each 8-port leaf network device 625. Thus, when viewed in terms of 4-port switches, network 602 consists of 3 tiers with 8 4-port switches in the bottom tier, 8 4-port switches in the middle tier, and 4 4-port switches in the top tier, though this network may still be viewed as having a leaf tier 620 and spine tier 630, as just described. It is seen in the figure, that network 602 may connect up to 16 end devices 610. Generalizing this, it is noted that a 3-tier leaf-spine network may connect a total number of end devices equal to $\frac{1}{4} \cdot l \cdot m \cdot n$, where I, m, and n are the number of ports in the devices forming the top, middle, and bottom tiers, respectively (e.g., in FIG. 7B, $\frac{1}{4} \cdot 4 \cdot 4 \cdot 4 = 16$). Thus, if n-port devices are used to build a network, the size of a 3-tier leaf-spine network scales as approximately $n^3$, whereas the size of a 2-tier leaf-spine network scales only as $n^2$. Accordingly, leaf-spine network architectures employing 3 tiers of network devices open up the possibility of efficiently assembling even larger networks.

Other Embodiments

Note that in the foregoing disclosure, numerous specific embodiments were set forth in order to provide a thorough understanding of the inventive concepts disclosed herein. However, it will be appreciated by those skilled in the art that in many cases the disclosed concepts may be practiced with or without certain specific details, such as by the substitution of alternative elements or steps, or by the omission of certain elements or steps, while remaining within the scope and spirit of this disclosure. Furthermore, where certain processes, procedures, operations, steps, elements, devices, modules, components, and/or systems are already well-known to those skilled in the art, they may not be described herein in as great of detail as is necessarily possible, so that the inventive aspects of this disclosure are not unnecessarily obscured. Furthermore, note that the foregoing disclosed processes, methods, systems, and apparatuses have been described in detail within the context of specific embodiments for the purpose of promoting clarity and understanding, it will be apparent to one of ordinary skill in the art that there are many alternative ways of implementing these processes, methods, systems, and apparatuses which are within the scope and spirit of this disclosure. Accordingly, the embodiments described herein are to be viewed as illustrative of the disclosed inventive concepts rather than limiting or restrictive, and are not to be used as an impermissible basis for unduly limiting the scope of the appended Claims.

The invention claimed is:

1. A method comprising:

receiving, by a first network device from a source host connected to a network, a packet;

identifying, from the packet, an identifier of a destination host;

determining, from location information stored on the network and based at least in part on the identifier of the destination host, a network location of a second network device connected to the destination host, without reference to a media access control address (MAC address) specified in the packet; and in response to and based on identifying the second network device from the location information, forwarding, by the first network device, the packet to the second network device connected to the destination host without reference to the MAC address specified in the packet.

2. The method of claim 1, wherein the location information comprises a list matching one or more IP addresses with the one or more locations on the network.

3. The method of claim 2, wherein:

the location information is associated with the first network device; and the location of the second network device is determined from the location information before the packet is forwarded from the first network device.

4. The method of claim 2, wherein:

the location information is associated with the second network device; and the location of the second network device is determined from the location information after the packet is forwarded from the first network device.

5. The method of claim 2, wherein the location information is stored at a database distributed across one or more network devices in the network.

6. The method of claim 1, wherein the packet is encapsulated.

7. The method of claim 1, wherein the first network device is a virtual switch device which operates within a virtualization layer, and wherein the source host issuing the packet operates as a virtual machine within the virtualization layer.

8. The method of claim 1, wherein the first network device is a leaf network device in a leaf/spine network fabric.

9. The method of claim 1, wherein the packet is an address resolution protocol packet.

10. A network device comprising:

at least one processor; and at least one memory, storing instructions which when executed by the at least one processor, causes the at least one processor to:

receive, from a source host connected to a network, a packet;

identify, from the packet, an identifier of a destination host;

determine, from location information stored on the network and based at least in part on the identifier of the destination host, a network location of a second network device connected to the destination host, without reference to a media access control address (MAC address) specified in the packet; and in response to and based on identifying the second network device from the location information, forward, by the first network device, the packet to the second network device connected to the destination host without reference to the MAC address specified in the packet.

11. The network device of claim 10, wherein the location information comprises a list matching one or more IP addresses with the one or more locations on the network.

12. The network device of claim 11, wherein:

the location information is associated with the network device; and the location of the second network device is determined from the location information before the packet is forwarded from the network device.

13. The network device of claim 11, wherein:

the location information is associated with the second network device; and the location of the second network device is determined from the location information after the packet is forwarded from the network device.

14. The network device of claim 11, wherein the location information is stored at a database distributed across one or more network devices in the network.

15. The network device of claim 10, wherein the packet is encapsulated.

16. The network device of claim 10, wherein the network device is a virtual switch device which operates within a virtualization layer, and wherein the source host issuing the packet operates as a virtual machine within the virtualization layer.

17. The network device of claim 10, wherein the network device is a leaf network device in a leaf/spine network fabric.

18. The network device of claim 10, wherein the packet is an address resolution protocol packet.

19. At least one non-transitory computer-readable medium, storing instructions which when executed by at least one processor, causes the at least one processor to:

receive, from a source host connected to a network, a packet;

identify, from the packet, an identifier of a destination host;

determine, from location information stored on the network and based at least in part on the identifier of the destination host, a network location of a second network device connected to the destination host, without reference to a media access control address (MAC address) specified in the packet; and in response to and based on identifying the second network device from the location information, forward, by the first network device, the packet to the second network device connected to the destination host without reference to the MAC address specified in the packet.

20. The at least one non-transitory computer-readable medium of claim 19, wherein the location information comprises a list matching one or more IP addresses with the one or more locations on the network.

* * * * *